US009606602B2

(12) United States Patent
Suryanarayanan et al.

(10) Patent No.: US 9,606,602 B2
(45) Date of Patent: Mar. 28, 2017

(54) METHOD AND APPARATUS TO PREVENT VOLTAGE DROOP IN A COMPUTER

(71) Applicant: Intel Corporation, Santa Clara, CA (US)

(72) Inventors: Anupama Suryanarayanan, Hillsboro, OR (US); Matthew C. Merten, Hillsboro, OR (US); Ryan L. Carlson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 14/318,999

(22) Filed: Jun. 30, 2014

(65) Prior Publication Data

US 2015/0378412 A1    Dec. 31, 2015

(51) Int. Cl.
*G06F 1/32* (2006.01)

(52) U.S. Cl.
CPC .................. *G06F 1/3206* (2013.01)

(58) Field of Classification Search
CPC ....... G06F 1/28; G06F 1/266; G06F 2212/621
USPC ......................................................... 713/340
See application file for complete search history.

(56) References Cited

U.S. PATENT DOCUMENTS

| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Vincent Tran
(74) *Attorney, Agent, or Firm* — Trop, Pruner & Hu, P.C.

(57) ABSTRACT

In an embodiment, a processor includes at least one core including a first core. The first core includes memory execution logic to execute one or more memory instructions, memory dispatch logic to output a plurality of memory instructions to the memory execution logic, and reactive memory instruction tracking logic. The reactive memory instruction tracking logic is to detect an onset of a memory instruction high power event associated with execution of at least one of the memory instructions, and to indicate to the memory dispatch logic to throttle output of the memory instructions to the memory execution logic responsive to detection of the onset of the memory instruction high power event. The processor also includes cache memory coupled to the at least one core. Other embodiments are described and claimed.

17 Claims, 21 Drawing Sheets

(56) References Cited

U.S. PATENT DOCUMENTS

| | | |
|---|---|---|
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,937,563 B2* | 5/2011 | Naffziger .............. G06F 1/3203 712/214 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0010679 A1* | 1/2004 | Moritz ................. G06F 1/3203 713/1 |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0082844 A1* | 4/2008 | Ghiasi ................. G06F 1/3203 713/323 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0252255 A1* | 10/2011 | Safford ................ G06F 1/3203 713/320 |
| 2012/0079290 A1 | 3/2012 | Kumar |
| 2012/0166854 A1* | 6/2012 | Rotem ................... G06F 1/28 713/340 |
| 2012/0221871 A1 | 8/2012 | Suryanarayanan et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111191 A1* | 5/2013 | Murray ................. G06F 9/384 712/214 |
| 2013/0111226 A1 | 5/2013 | Ananthakrishnan et al. |
| 2013/0111236 A1 | 5/2013 | Ananthakrishnan et al. |
| 2013/0275787 A1* | 10/2013 | Safford ................ G06F 1/3234 713/320 |
| 2013/0346774 A1 | 12/2013 | Bhandaru et al. |
| 2014/0068290 A1 | 3/2014 | Bhandaru et al. |
| 2014/0157277 A1* | 6/2014 | Eisen ........................ G06F 1/26 718/102 |
| 2014/0181537 A1* | 6/2014 | Manne .................... G06F 1/324 713/300 |
| 2014/0195829 A1 | 7/2014 | Bhandaru et al. |
| 2014/0201542 A1* | 7/2014 | Kommrusch ............. G06F 1/30 713/300 |
| 2014/0208141 A1 | 7/2014 | Bhandaru et al. |
| 2014/0245034 A1 | 8/2014 | Rotem et al. |
| 2014/0317422 A1 | 10/2014 | Rosenzweig et al. |
| 2014/0317425 A1* | 10/2014 | Lien ...................... G06F 1/3237 713/320 |
| 2015/0033045 A1* | 1/2015 | Raghuvanshi ........ G06F 1/3234 713/320 |
| 2015/0089198 A1* | 3/2015 | Sommers ............. G06F 9/3836 712/214 |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

\* cited by examiner

METHOD AND APPARATUS TO PREVENT VOLTAGE DROOP IN A COMPUTER

TECHNICAL FIELD

Embodiments relate to power management of a system, and more particularly to power management of a multicore processor. Embodiments relate to prevention of voltage droop in a computer system.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
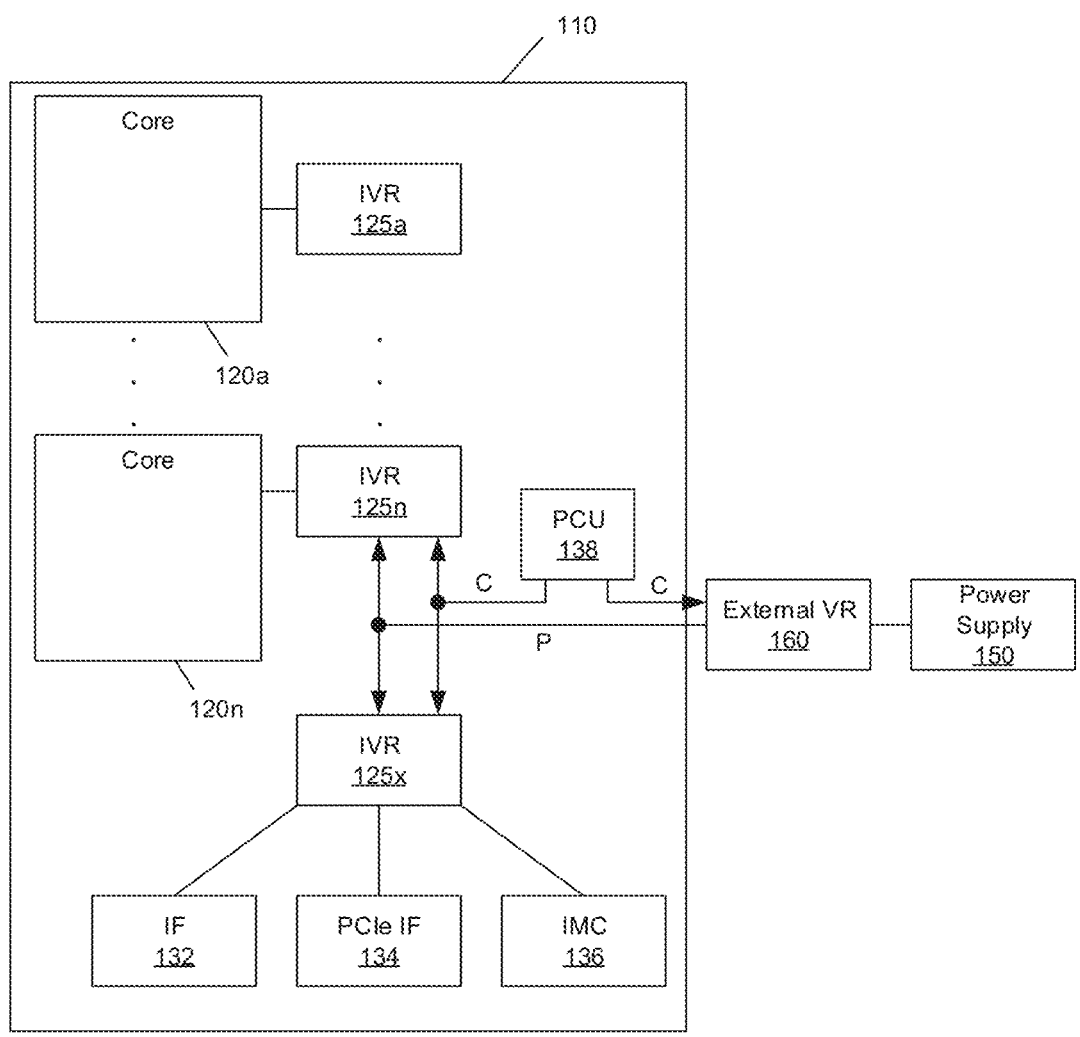
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120$_a$-120$_n$. In addition, each core may be associated with an integrated voltage regulator (IVR) 125$_a$-125$_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered Still referring to FIG. 1, additional components may be present within the processor including an input/output interface 132, another interface 134, and an integrated memory controller 136. As seen, each of these components may be powered by another integrated voltage regulator 125$_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management, in accordance with embodiments of the present invention. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
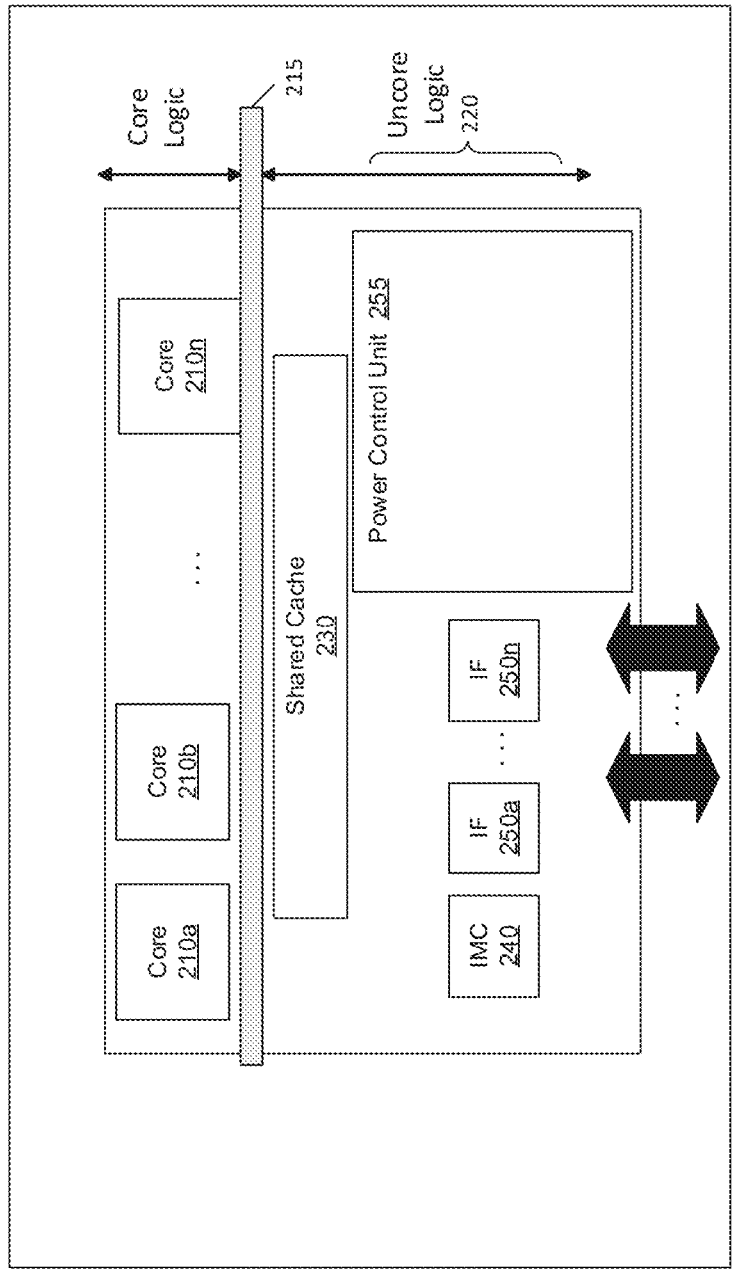
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores 210$_a$-210$_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
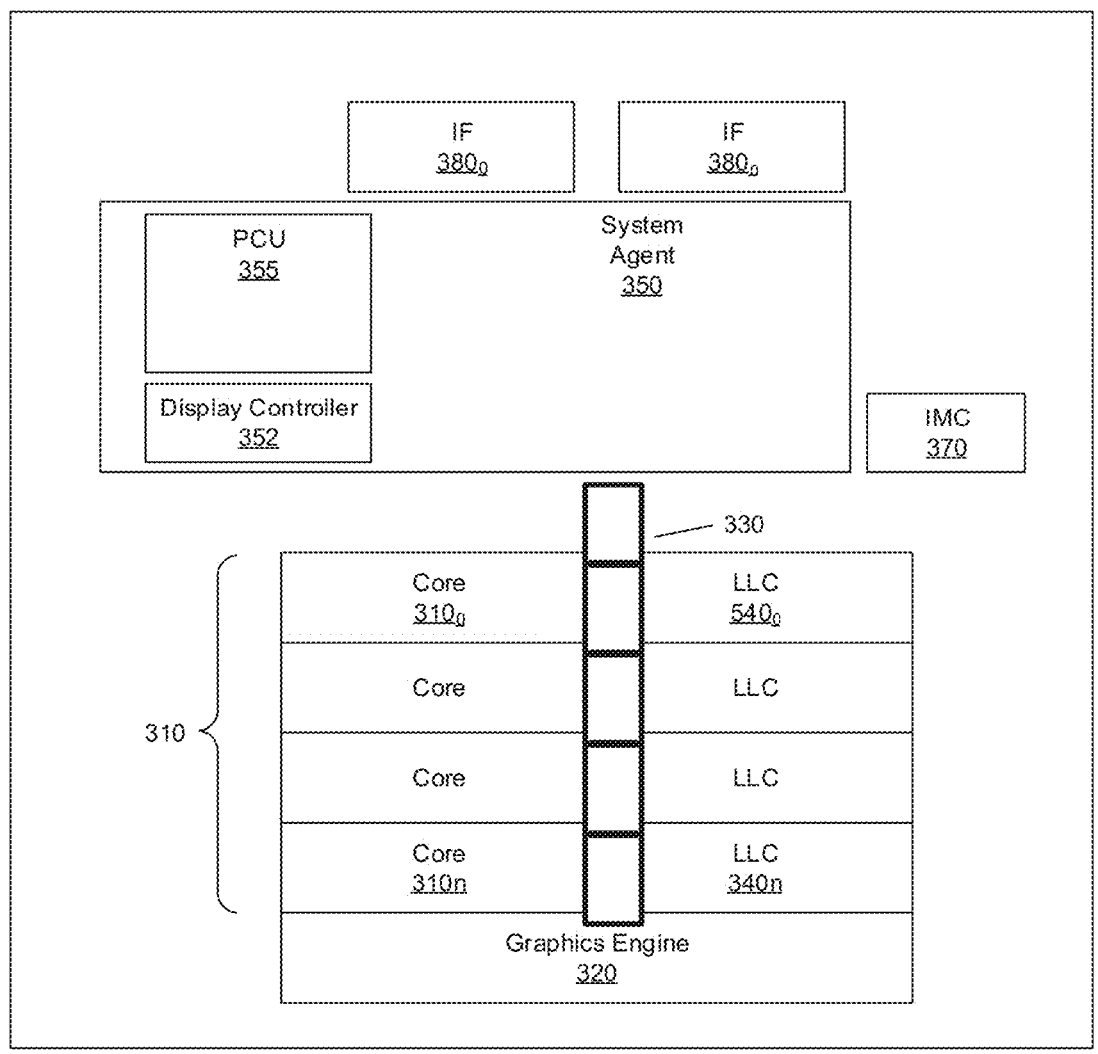
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect 330 can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3, understand the scope of the present invention is not limited in this regard.

Figure 4:
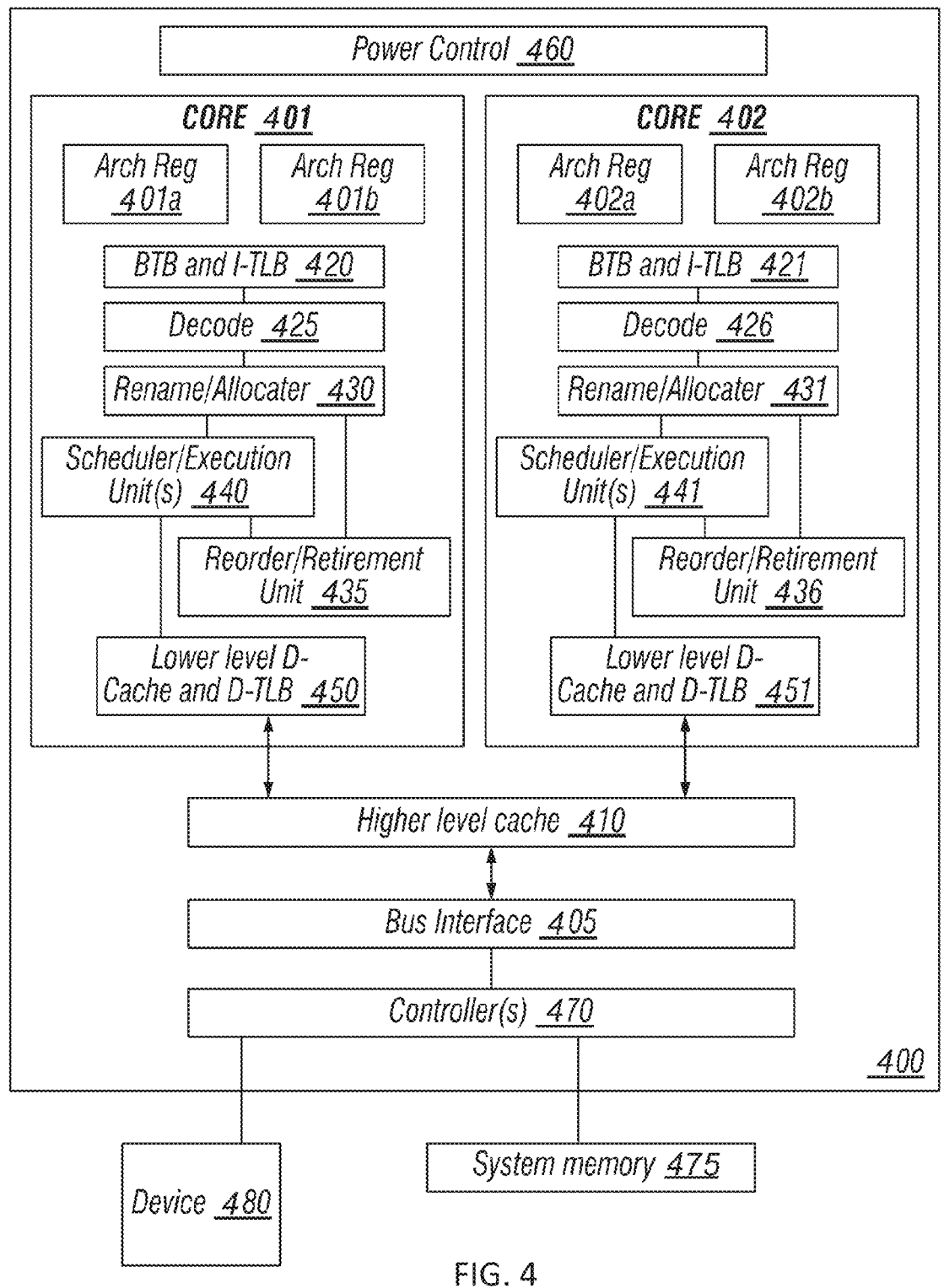
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory (e.g., system memory 475) and a graphics controller for interfacing with a graphics processor (not shown). In an SoC environment, even more devices, such as a network interface, coprocessors, memory, graphics processor, and any other known computer devices/interface may be integrated on a single die or integrated circuit to provide small form factor with high functionality and low power consumption.

Figure 5:
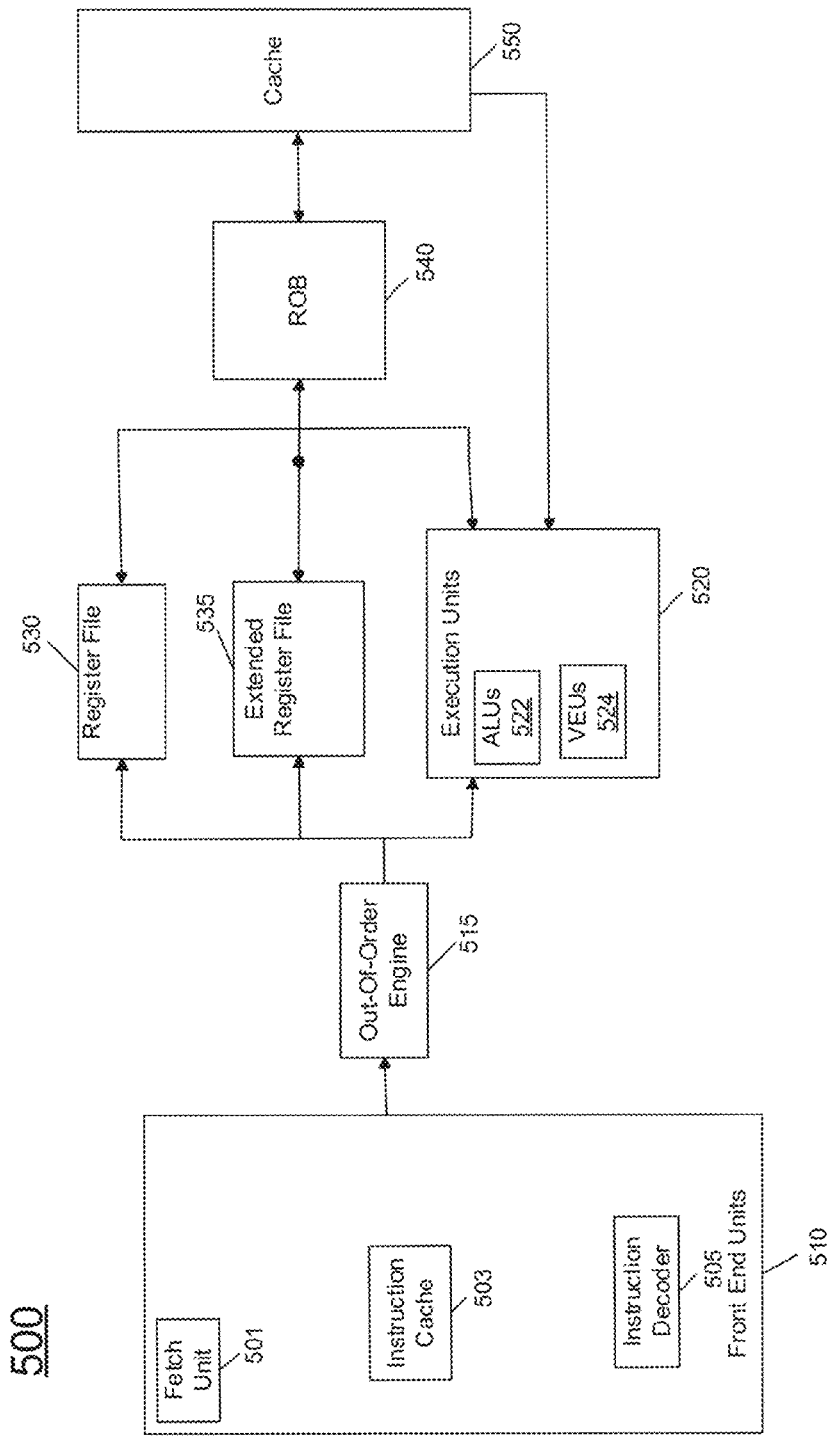
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
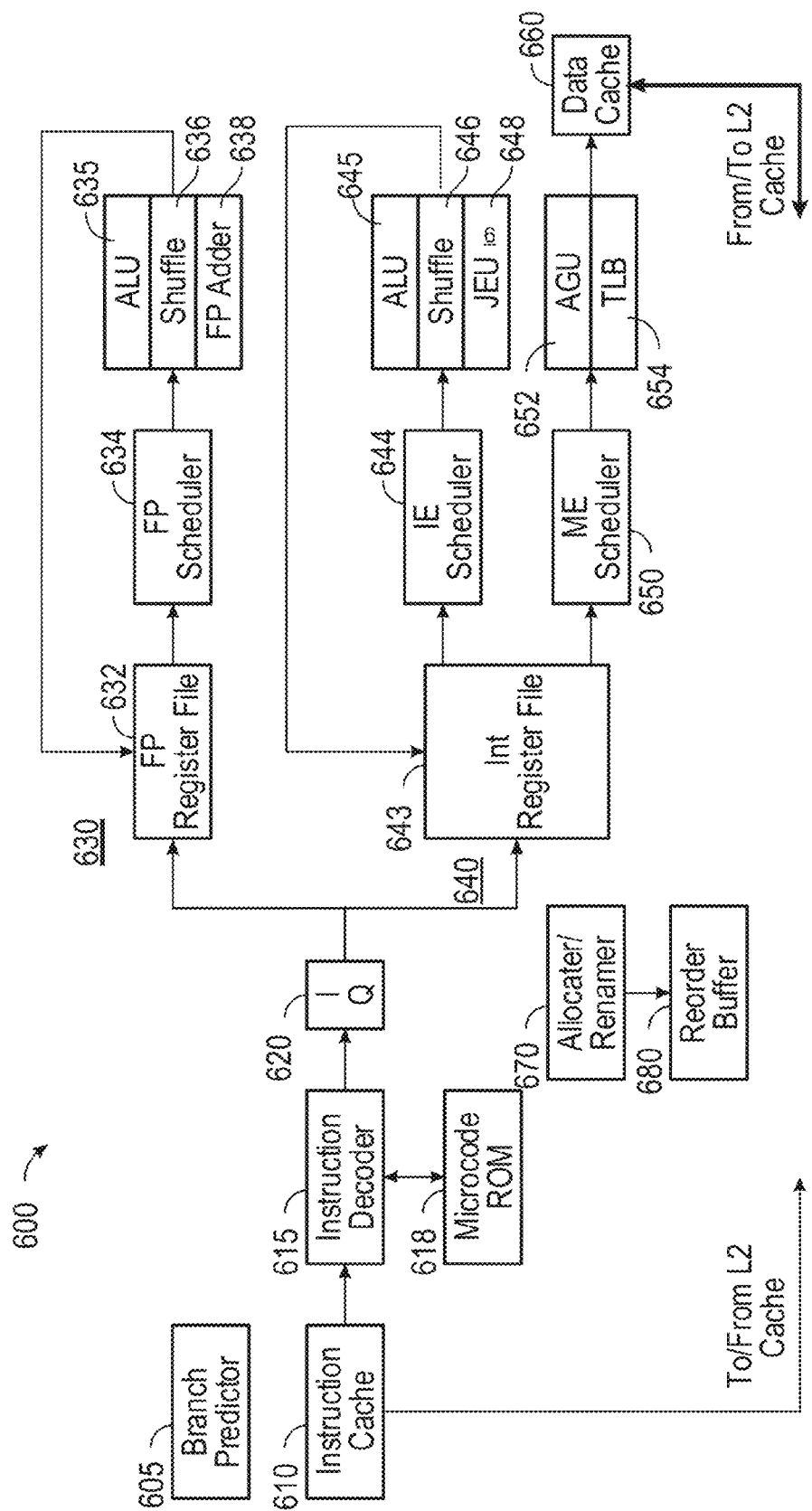
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
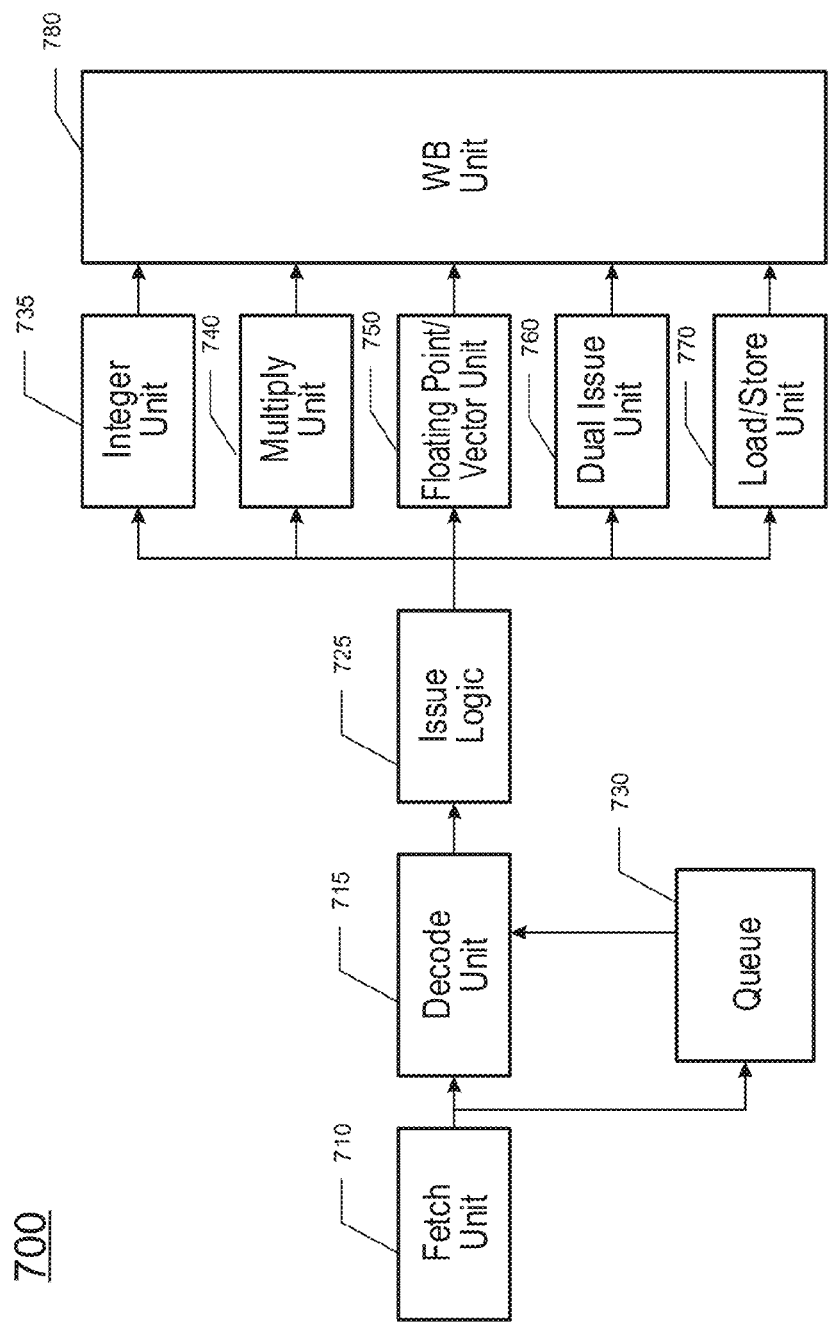
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
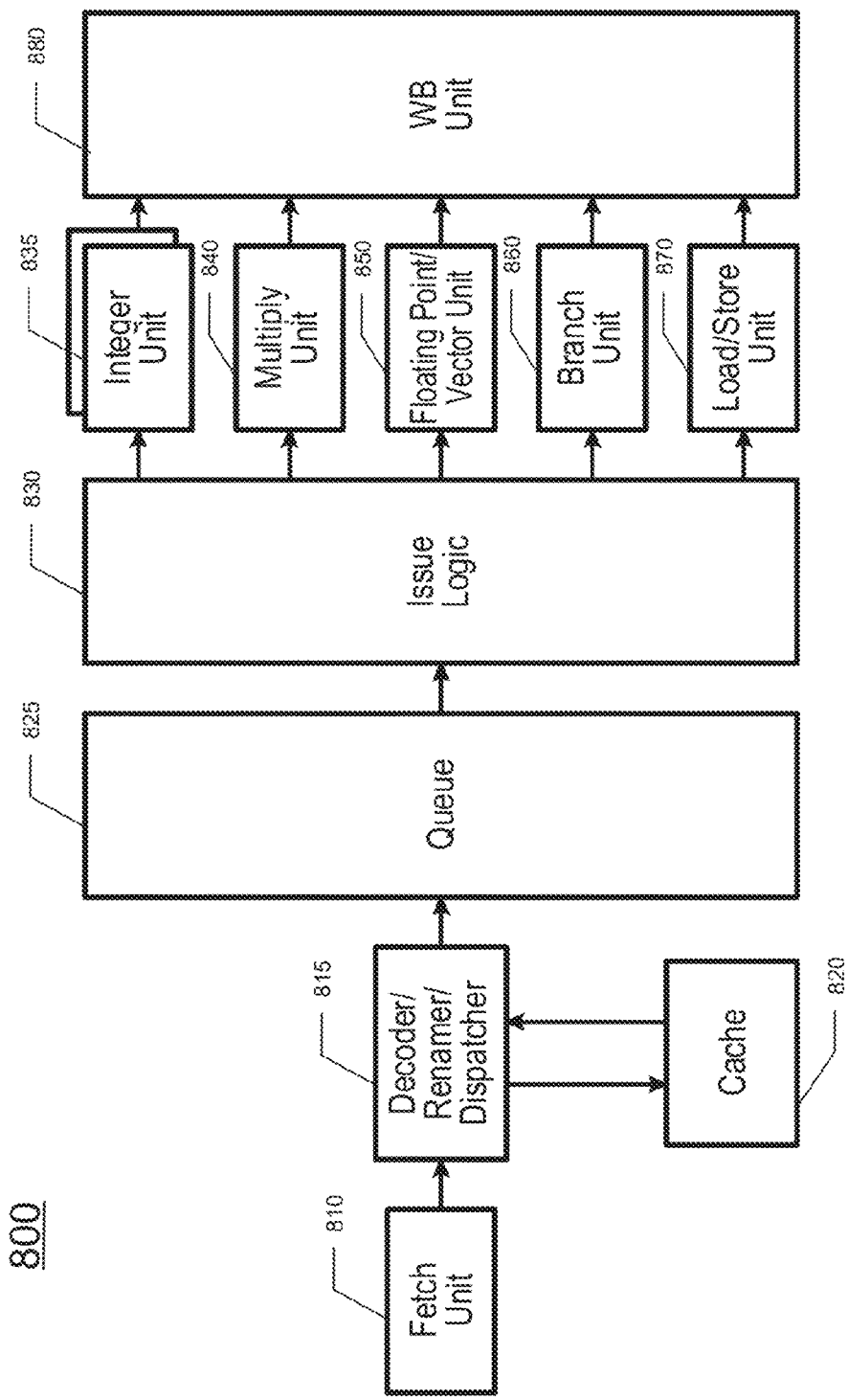
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
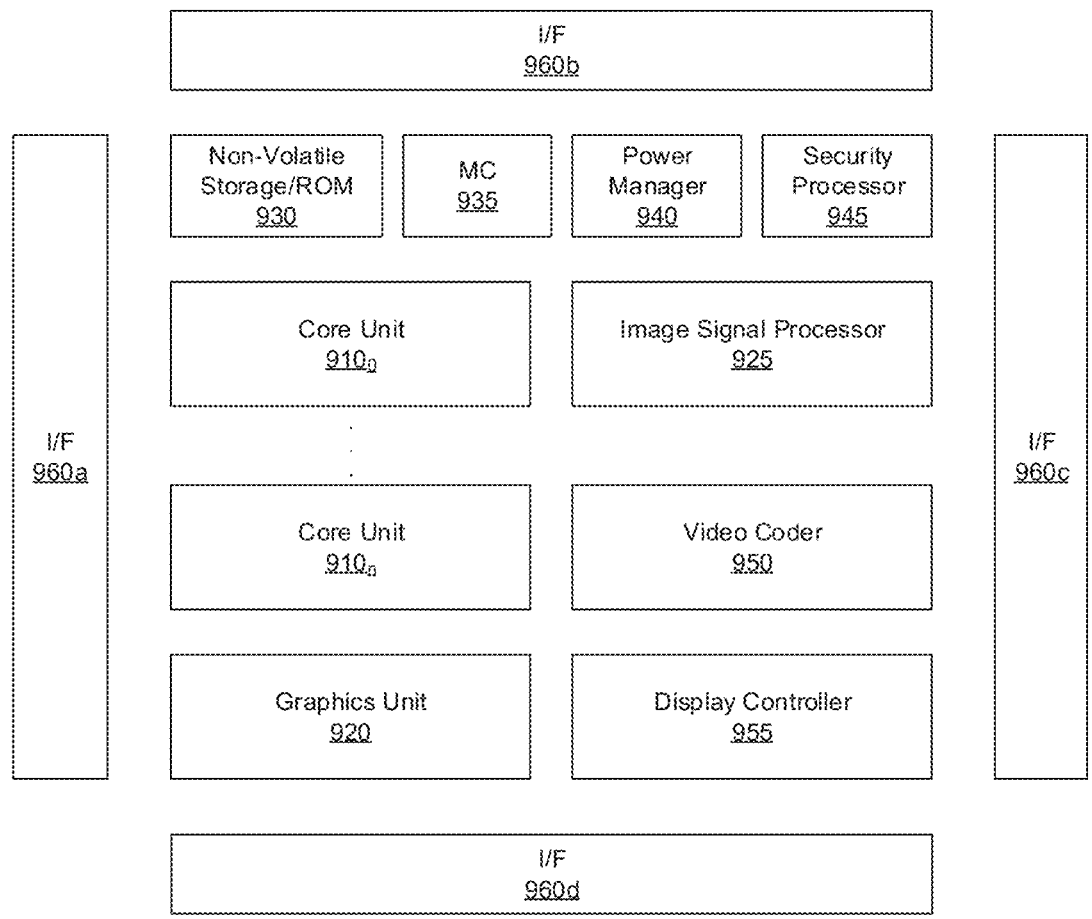
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
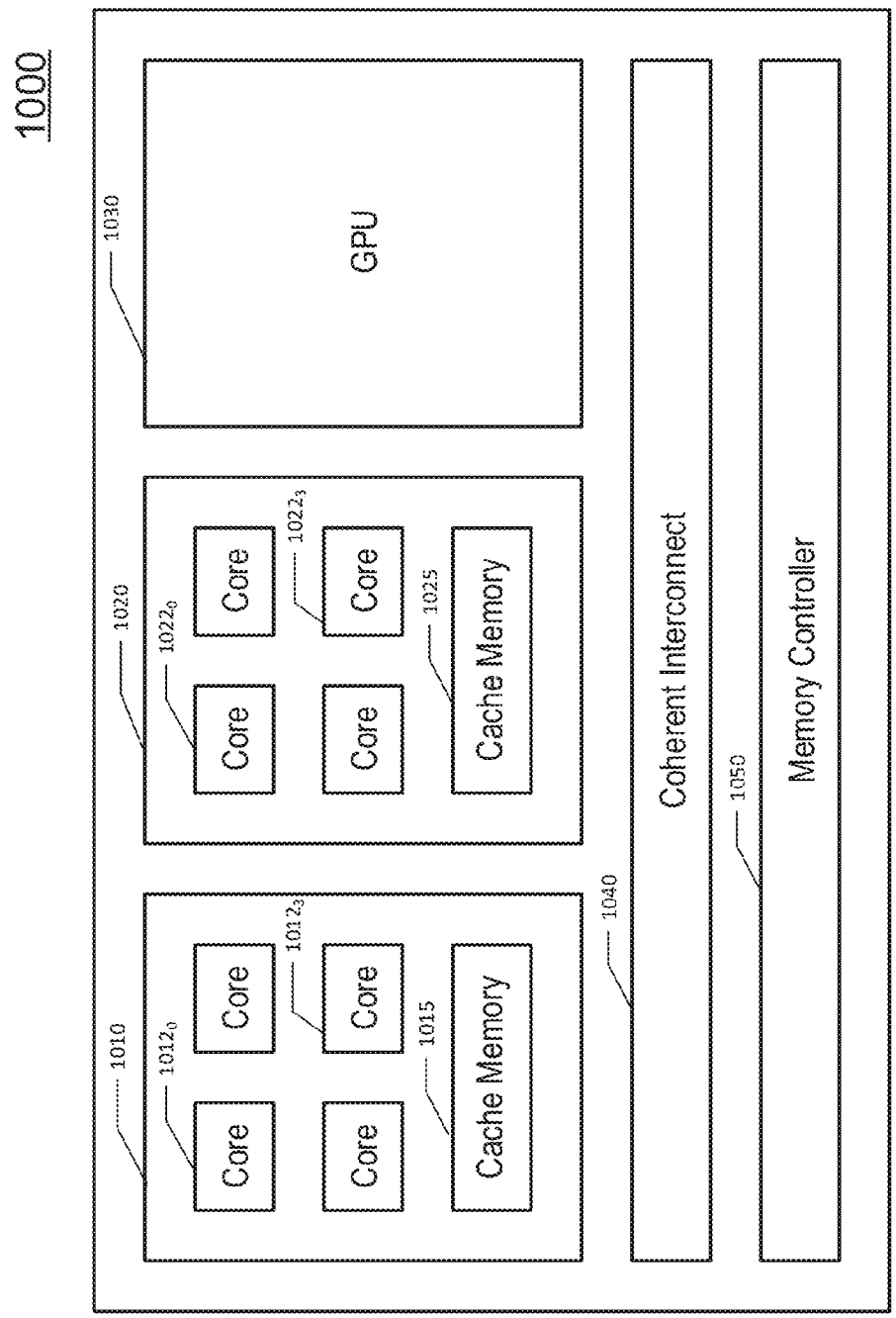
FIG. 10 is a block diagram of a representative system on a chip (SoC) in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
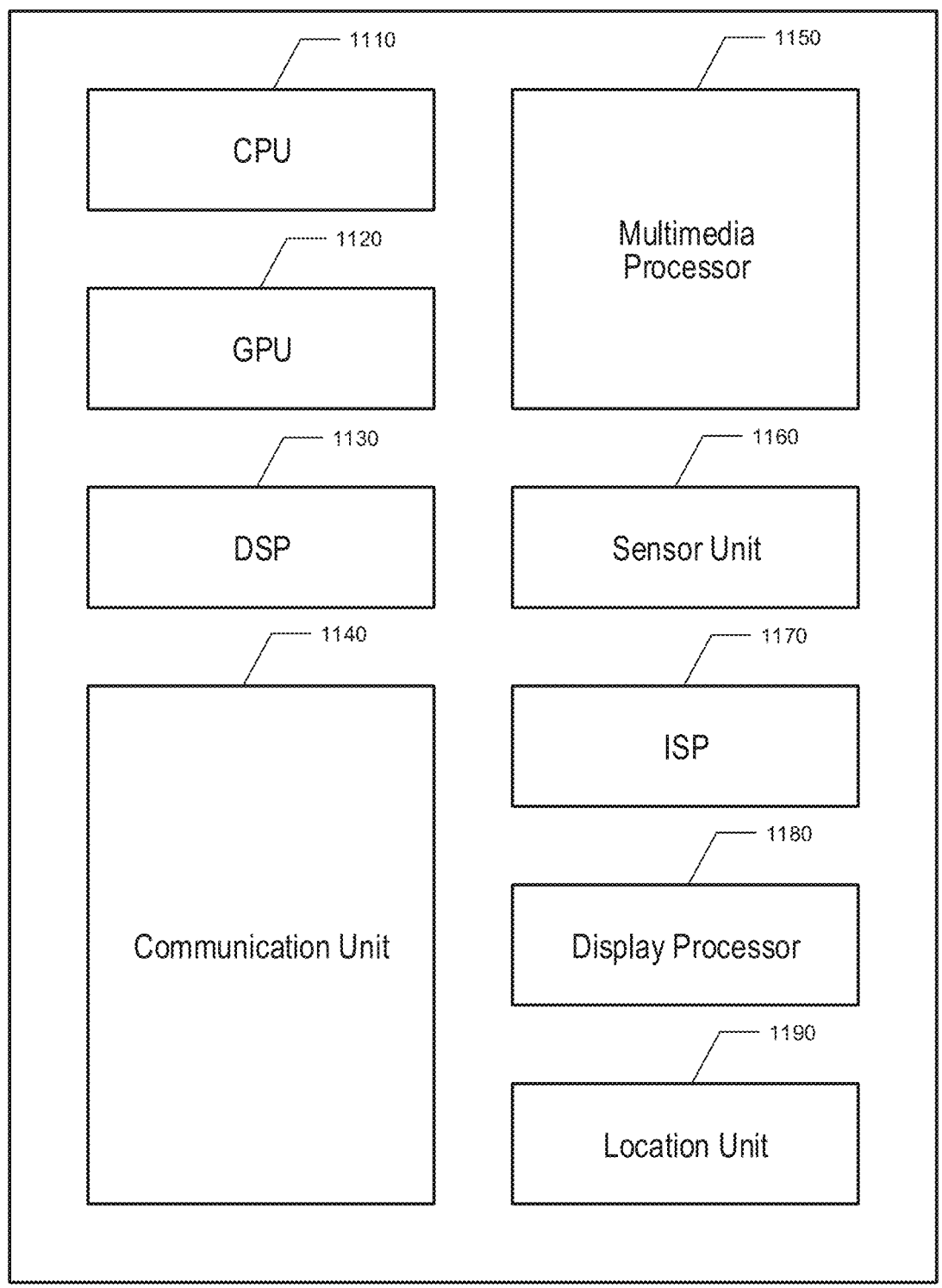
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible. Power supplied to various domains and to various cores, GPU(s), and other processing units of FIG. 11 may be determined at least in part according to embodiments presented herein.

Figure 12:
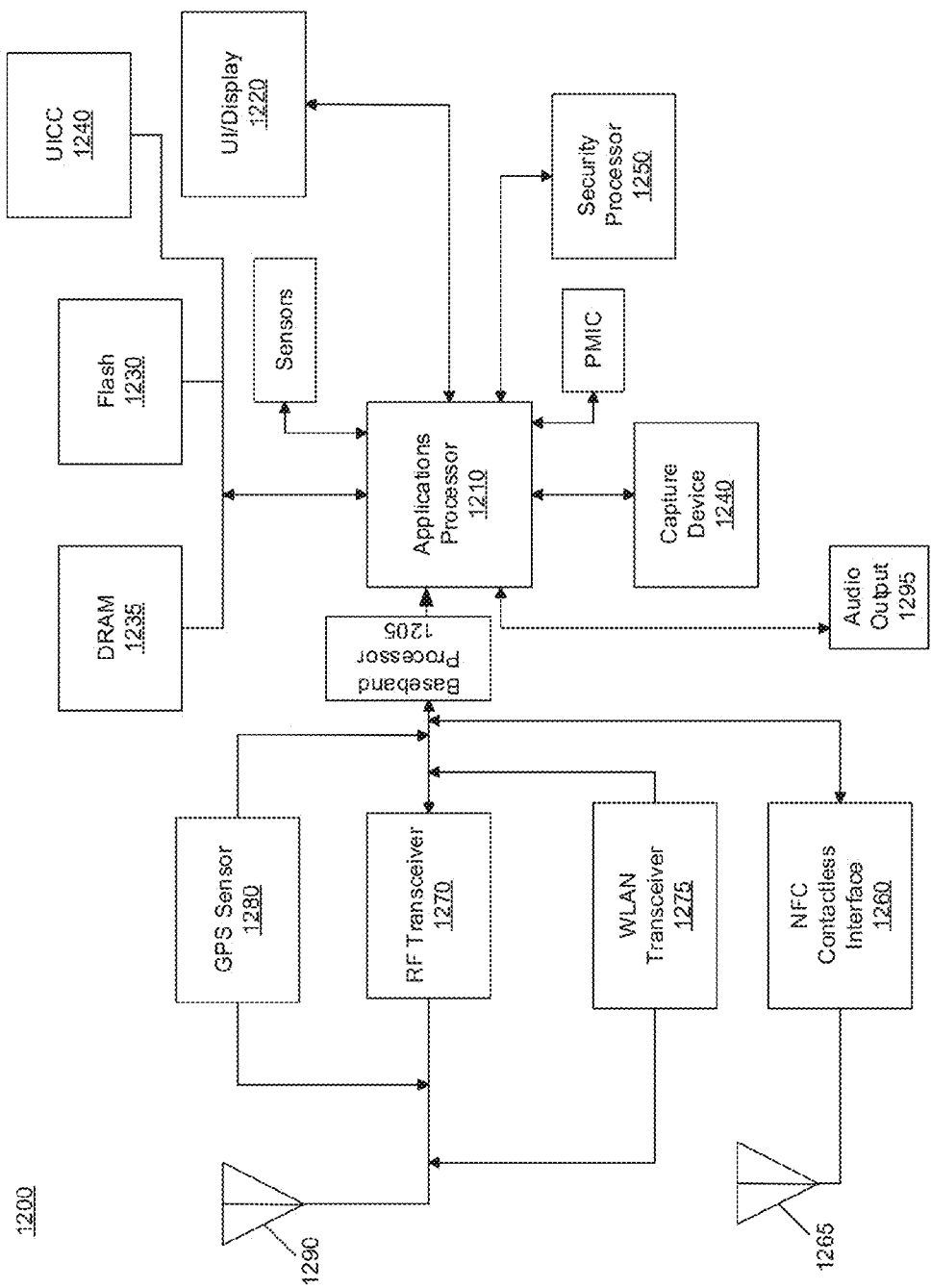
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
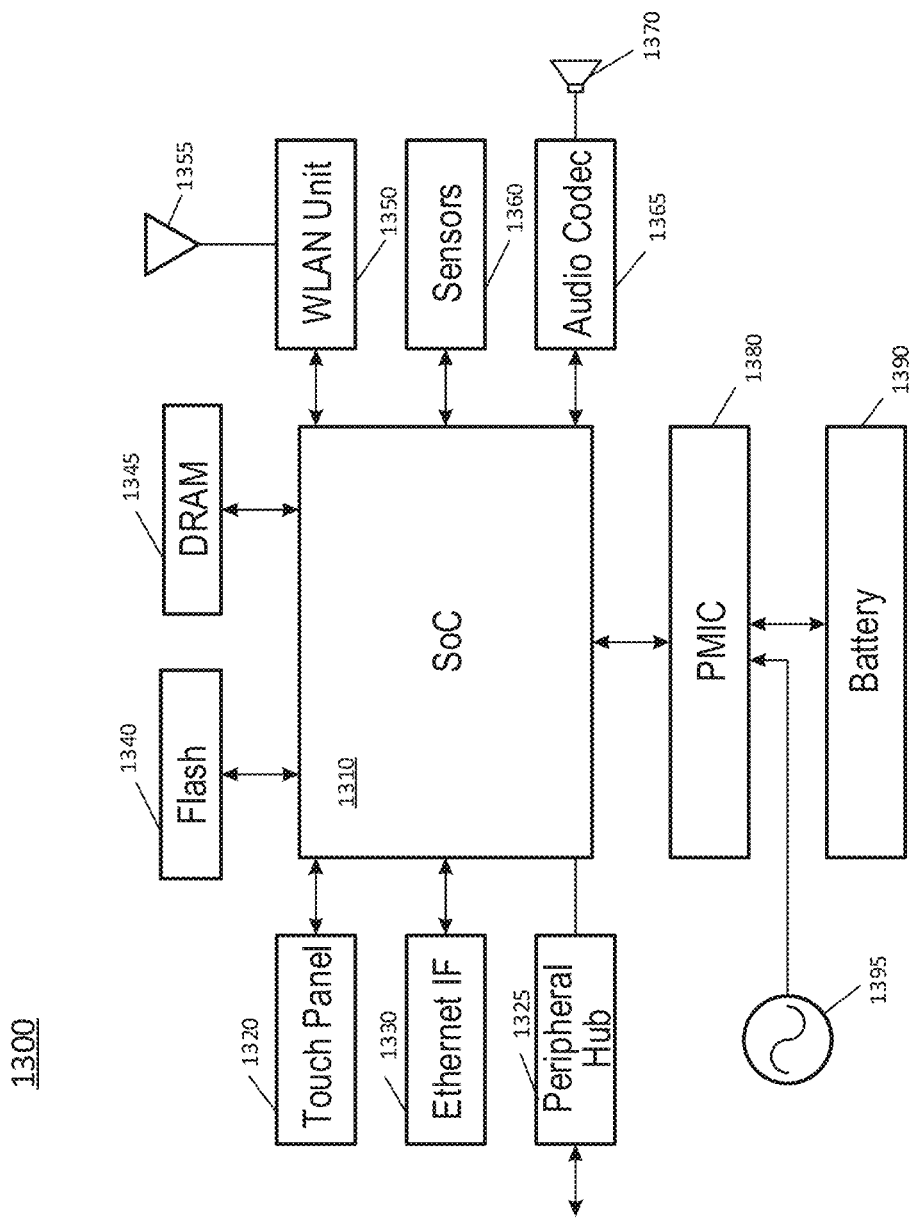
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
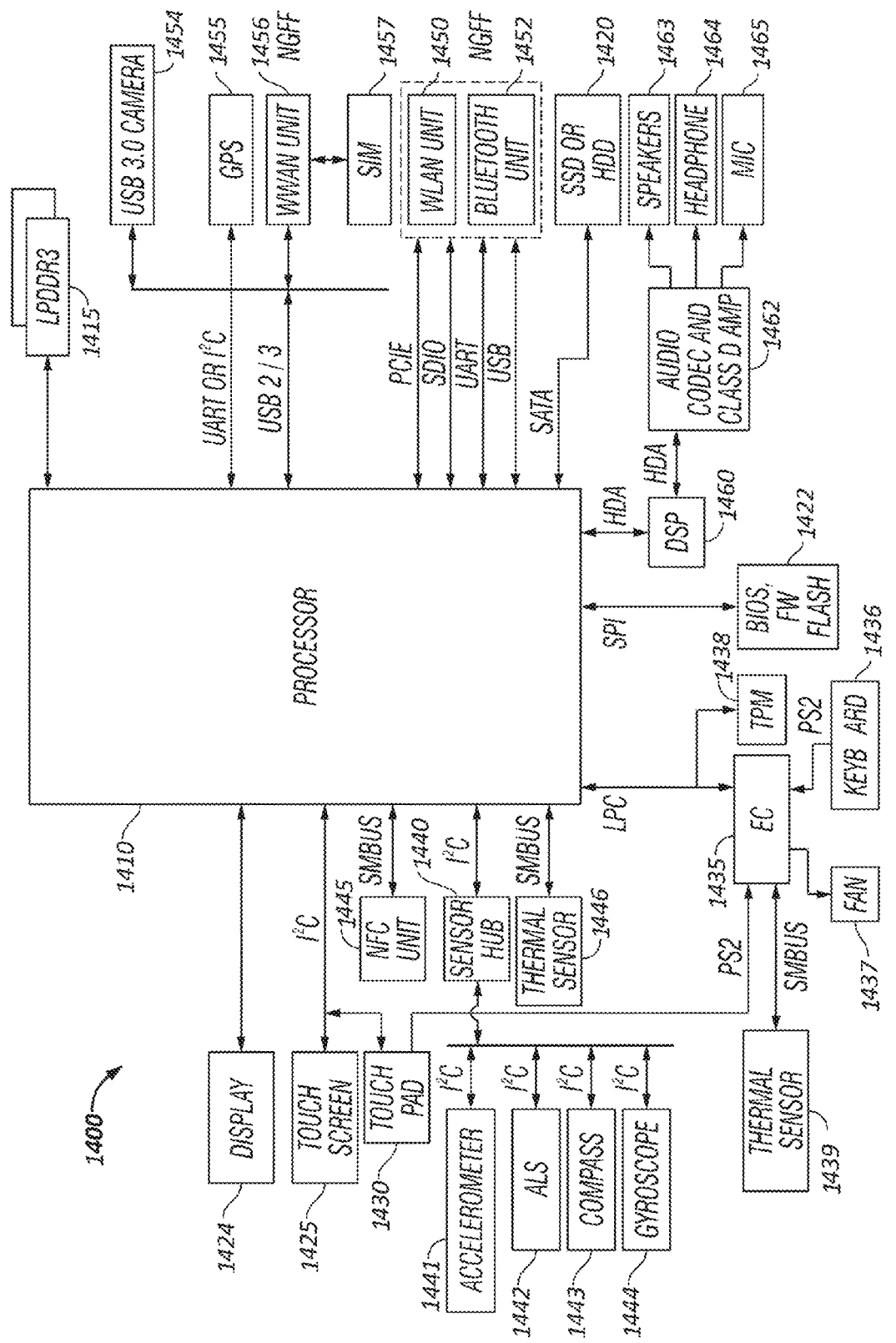
FIG. 14 is a block diagram of a representative computer system.

Referring now to FIG. 14, a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Power supplied to various domains and to various cores, GPU(s), and other processing units of FIG. 14 may be controlled at least in part according to embodiments presented herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I$^2$C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
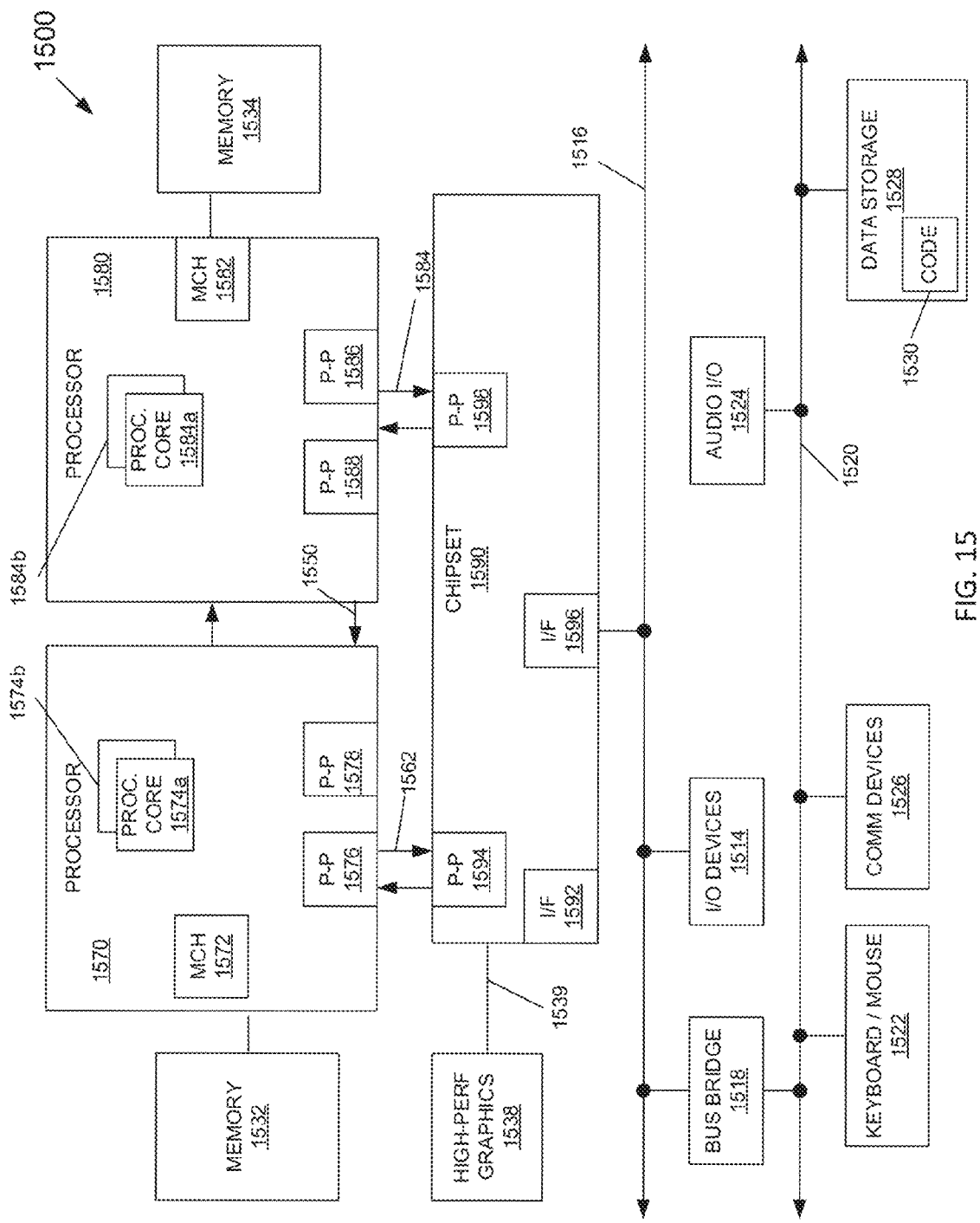
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Power consumed by a processor may be affected by factors that can include instruction types, data being operated on, dispatch rates of instructions, and other factors. Sudden changes in any of these factors can lead to rapid changes in current drawn by the processor, and thus may cause voltage instability. A rapid change in current drawn by a circuit on a chip can cause a temporary droop (or spike) in a supply voltage received from a voltage regulator (VR). An increase in the current may result in a droop in the voltage supplied by the VR, while a decrease in current may be reflected as a spike in supply voltage. A transistor's switching speed is a function of voltage applied to its gate; at lower voltages transistor switching speed typically decreases. A droop in a local supply voltage can be problematic, e.g., droop can slow down logic elements between latches, potentially causing failures, e.g., if these latches and clocks to them are not local to an event and run at full speed. Moreover, the voltage droop may get coupled back to input of the VR, causing other circuits on the chip to fail.

One solution to the problem of voltage droop is to add sufficient capacitance to supply excess current needed during a current ramp until the VR is able to recover sufficiently. Addition of capacitance however, can be expensive, since the capacitance is typically more effective when situated close to on-chip logic than when situated further from the on-chip logic. The problem of voltage droop can also be solved electrically through early detection of a current spike and permitting the voltage regulator to dump current into the circuit, but a determination that a current spike is in progress before arrival of a main portion of the current spike may be difficult to accomplish.

In various embodiments, one or more detectors may be utilized to identify an onset of power change (e.g., surge) that can result in voltage droop. For example, a static (e.g., classification-based) detector can check for existence of certain instructions or micro-operations (µops) in a processor pipeline at any given instant in time. Instructions and/or µops may be classified into two or more classes based on an expected power draw (and contribution to a potential voltage droop situation). Typically, instructions within a particular class have similar power characteristics, while different classes of instructions have different power characteristics. Classes may be distinguished from one another according to any of a number of factors, such as type of operation (for example, arithmetic or logical), number of elements operated upon simultaneously (for example, scalar, 2, 4, 8, or 16), or functional unit utilized (for example, arithmetic logic unit (ALU), address generation unit (AGU), or branch unit). Typically, the higher a worst-case power consumed by instructions in a particular class, the greater a potential voltage droop due to a high power event, and hence the higher would be a "perceived risk." A high power event may be an event in which power consumed rises rapidly from a previously lower level, such as a precipitous rise in power usage in a relatively short time interval.

As instructions flow through the processor pipeline, a static detector may detect a 'high risk' instruction class present in the pipeline, e.g., at least one of the instructions ("high power instruction" herein) may result in high power usage when executed. Such high power instructions may include, but are not limited to, e.g., floating point multiply instructions, single-instruction-multiple-data (SIMD) instructions, and other instructions.

The processor may operate in one of several possible modes, each of which may protect against a corresponding voltage droop. If the mode of operation does not adequately compensate for the voltage droop, then the processor may decide on a mitigation strategy based on the perceived risk of the corresponding instruction class.

It is to be noted that the static detector operates on a basis of perceived risk due to the associated instruction class. Factors including dynamic power characteristics, such as data patterns and instruction/µop dispatch rates, are not typically factored into the perceived risk as determined by the static detector.

Dynamic (e.g., performance-based) detectors may be more fine-grained in their detection than static detectors. Dynamic detectors aim to detect voltage droops as they happen by looking for dynamic changes in performance. Alternatively, it may be possible to predict or foresee a potential voltage droop by monitoring instructions as they are being sent to execution units, but before the execution units actually begin processing the instructions (and thus consume power). Several versions of a dynamic detector may be employed. For example, a single or several instances of a dynamic detector may be utilized in the processor, e.g., at different points the processor pipeline (also "pipeline" herein). The different points within the processor may be selected based on an impact that each point has on throughput of the pipeline. For example, effective points to monitor may include an entire out of order subsystem or a portion thereof, a memory subsystem or a portion thereof, etc.

Corrective mechanisms may be employed to ensure that a circuit doesn't exhibit failures due to, e.g., one or more droops in the supply voltage. For example, the voltage droop may be prevented or decreased in magnitude through the corrective mechanisms. Alternatively, adequate voltage guardband (e.g., voltage headroom) may be provided to cover a risk of voltage droop. Several corrective mechanisms may be employed, operating cooperatively. A particular corrective mechanism may be selected based on a choice of detector.

One corrective action mechanism is to pre-emptively increase voltage supplied to a target circuit. Such a mechanism is intended to provide enough voltage guardband (also "guardband" herein) to tolerate a potential worst case voltage droop. Since voltage changes typically happen slowly, this technique is effective when used in conjunction with a detector that can provide adequate warning (e.g., the static classification-based detector). Furthermore, additional mechanisms (e.g., a mechanism to throttle instruction dispatch) may be employed to protect the processor during a voltage change. To be effective, the corrective action mechanism employed may be based on factors that include magnitude of voltage increase that is expected to be applied, impact of the increased voltage on power consumption of the circuit, temperature, operating frequency, etc., and time taken to increase the voltage when an "unacceptable risk" situation is detected. Depending on a resolution (e.g., granularity) of the detection mechanism and a number of levels employed, several levels of risk can be identified, and the voltage may be changed accordingly.

Another corrective action mechanism includes preemptive throttling of instruction dispatch, i.e., the dispatch of some or all instructions (or μops) may be throttled to a pre-determined level for fixed or a programmable duration of time, or may be throttled based upon a pre-determined/programmable pattern for a fixed or a programmable duration of time. This corrective action mechanism relies on the fact that power consumption in a microprocessor is dependent upon throughput and type of instructions (e.g., μops) that flow through the pipeline. A detailed design of the corrective action mechanism further depends on a type of detector used and on detector characteristics. For example, preemptive throttling is effective when paired with a dynamic detector. Some factors that are relevant in design of this mechanism include magnitude of the potential voltage droop problem as identified by the detector, impact of throttling on performance impact, droop reduction, and reaction time of the throttling mechanism, e.g., the time taken for the activation of the reactive mechanism beginning from a time that the detector asserts a signal to effect a correction.

In some cases, as a further optimization, it is useful to have a "watchdog" mechanism (also "watchdog logic herein", e.g., which may include watchdog tracking logic and/or state control logic) that keeps track of a history of droops and overrides the corrective mechanism, e.g., selects a different corrective mechanism if the mechanism in operation is deemed to be sub-optimal. For instance, in a design with a dynamic detector and an instruction throttling-based corrective scheme, increase of the operating voltage to compensate for the maximum risk voltage droop may be more advantageous than repeated throttling. The watchdog mechanism may keep track of a frequency with which the detector fires (e.g., detects an imminent problem) and the watchdog mechanism may cause an increase in the operating voltage for a determined period time if this frequency of detection exceeds a programmable threshold (e.g., and may disable the instruction throttling mechanism for this determined period of time). A hybrid scheme is also possible in which the watchdog mechanism causes a moderate increase in voltage, but not enough of an increase in voltage to cover a maximum anticipated risk droop. The hybrid scheme can also keep the dynamic/compensator mechanism active, e.g., pre-emptively looking for a largest of the voltage droops and throttling as necessary. Such a hybrid scheme may be less detrimental to overall power increase than exclusive use of voltage guardband adjustment.

Figure 16:
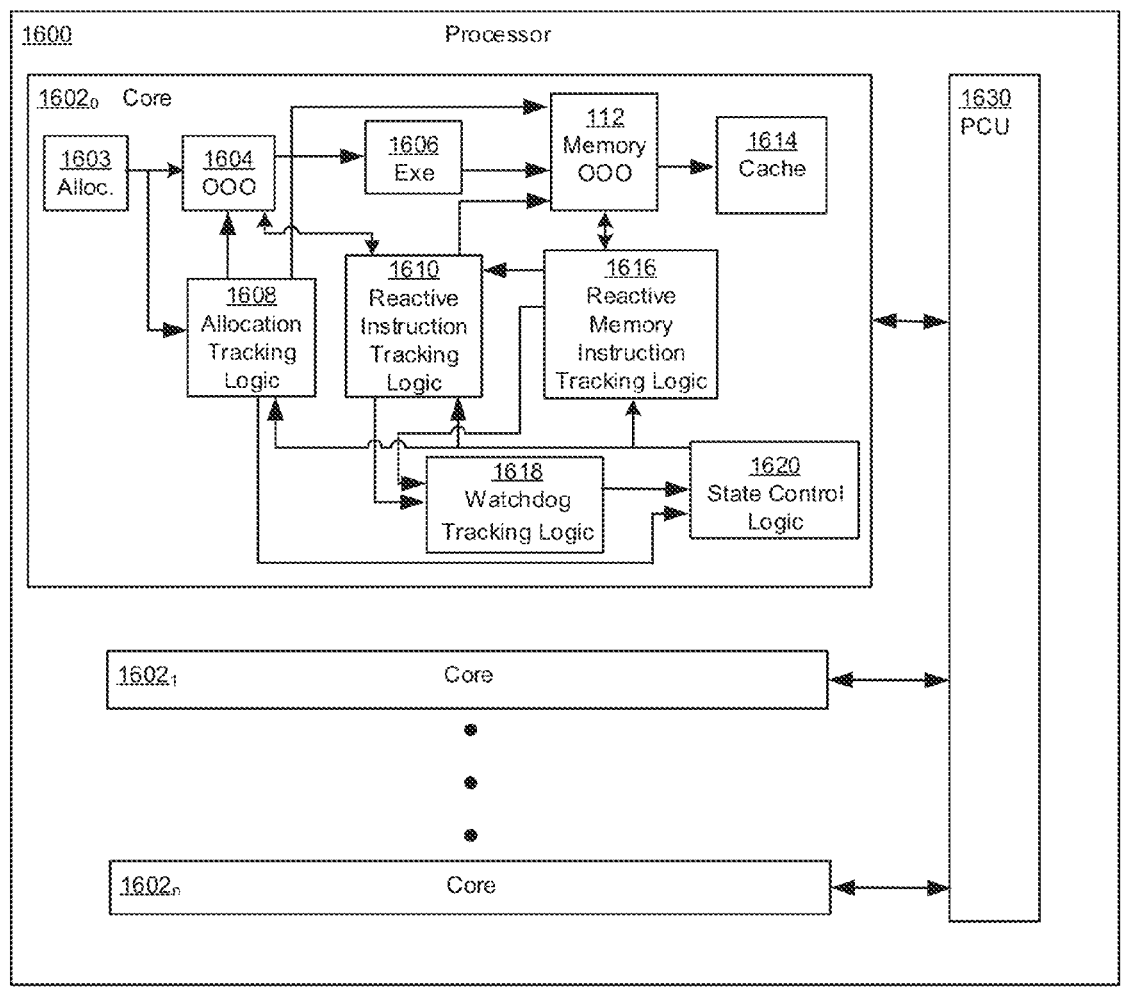
FIG. 16 is a block diagram of a processor according to an embodiment of the present invention.

Referring to FIG. 16, shown is a block diagram of a processor 1600, according to an embodiment of the present invention. The processor 1600 may include a plurality of cores $1602_0, \ldots, 1602_n$, and power control unit (PCU) 1630. Core $1602_0$ includes allocation logic 1603, out of order dispatch logic (OOO) 1604, execution logic 1606, memory OOO dispatch logic (memory OOO) 1612, cache memory 1614, allocation tracking logic 1608, reactive instruction tracking logic 1610, reactive memory instruction tracking logic 1616, watchdog tracking logic 1618, and state control logic 1620.

In operation, the allocation logic 1603 sends instructions or micro-instructions to the OOO 1604, which can determine an order of instructions (or micro-instructions) in an execution queue, e.g., instructions to be executed during a first time period by the execution logic 1606. The allocation tracking logic 1608 can detect, at an input of the OOO 1604, any instance of one or more instructions identified as a "high power instruction," e.g., the instruction may result in high power consumption during execution of the instruction. Upon detection of a high power instruction in the instruction queue, the allocation tracking logic may cause the OOO 1604 to throttle flow of the instructions until the high power instruction is executed and retired. Throttling the flow of instructions may serve to reduce the risk of voltage droop associated with high power consumption in the core $1602_0$.

As the execution logic 1606 executes instructions received from the OOO 1604, the reactive instruction tracking logic 1610 can detect dynamic changes in performance (e.g., power consumption) by comparison of a first count and type of instructions, executed in a first time window, to a second count and type of instructions executed in a second time window. Such dynamic changes may be associated with a high power event in the execution logic 1606. The reactive instruction tracking logic 1610 may signal to the OOO 1604 to throttle throughput of instructions based upon one or more such comparisons, e.g., comparisons of successive time windows over a span of time.

The reactive instruction tracking logic 1610 may compare anticipated power consumption for successive windows of time via one of several techniques (described below) to determine whether a high power event is in progress that can result in voltage droop. For example, if a weighted sum of instructions (e.g., weighted according to power usage associated with each instruction) over a span of time reaches a threshold level (e.g., through determination of a rolling sum), the reactive instruction tracking logic 1610 may signal to the out of order logic 1604 to throttle throughput of instructions. The reactive instruction tracking logic 1610 may also signal to memory OOO 1612 to throttle throughput of memory instructions, e.g., cache access instructions to the cache memory 1614. The reactive instruction tracking logic 1610 can indicate each high power event to the watchdog tracking logic 1618, which can maintain a count of high power events and can do a comparison to a high power event threshold to determine if a critical frequency of high power events has been reached.

Some instructions (e.g., memory instructions including load and store instructions) are passed from the execution logic 1606 on to the memory OOO 1612, which sends the memory instructions to the cache 1614 for storage or retrieval of data. The reactive memory instruction tracking logic 1616 may conduct a rolling count of instructions dispatched from the memory OOO 1612 to detect a memory instruction high power event. Upon detection of a memory instruction high power event, the reactive memory instruction tracking logic 1616 may signal to the memory OOO 1612 to throttle memory instructions for a determined time period in order to avoid voltage droop. In some embodiments, the signal to throttle memory instructions is sent to the memory OOO 1612 (e.g., when the detected memory instruction high power event follows an idle period, e.g., a window of very low memory access activity). In some embodiments the reactive memory instruction tracking logic 1616 may send an indication to the watchdog tracking logic 1618 of each memory instruction high power event and the watchdog tracking logic 1618 can maintain a count of memory instruction high power events.

The watchdog tracking logic 1618 can receive information from the reactive instruction tracking logic 1610 and from the reactive memory instruction tracking logic 1616, can maintain a history of voltage droops determined from the information received, and can make comparisons of voltage droop frequency to a voltage droop threshold frequency. The watchdog tracking logic 1618 can provide information to the state control logic 1620 including an indication that the voltage droop threshold frequency has been exceeded.

The state control logic 1620 can determine whether to change the voltage guardband, based at least in part on the information received from the watchdog tracking logic 1610. Additionally, the state control logic 1620 may send indications to the allocation tracking logic 1608, reactive instruction tracking logic 1610 and/or reactive memory instruction tracking logic 1616 to discontinue throttling of instruction flow/memory instruction flow, e.g., return to an unthrottled mode. Alternatively, the state control logic 1620 may send indications to the allocation tracking logic 1608, reactive instruction tracking logic 1610 and/or reactive memory instruction tracking logic 1616 to alter a threshold level or conditions under which throttling will occur, e.g., by re-assigning a classification of one or more instructions to/from a high-power classification, or by changing a weight associated with one or more instructions (reflecting a power consumption associated with those instructions).

Change of the voltage guardband may result in more efficient operation than throttling instruction throughput. The state control logic 1620 may decide to increase the voltage guardband and restore instruction throughput (e.g., stop throttling of instructions) to increase efficiency of operation of the processor 1600. The state control logic can send a request to the PCU 1630 to change the voltage guardband.

Thus, through a combination of instruction throttling and voltage guardband adjustment, instances of voltage droop and severity of voltage droop can be reduced.

Figure 17:
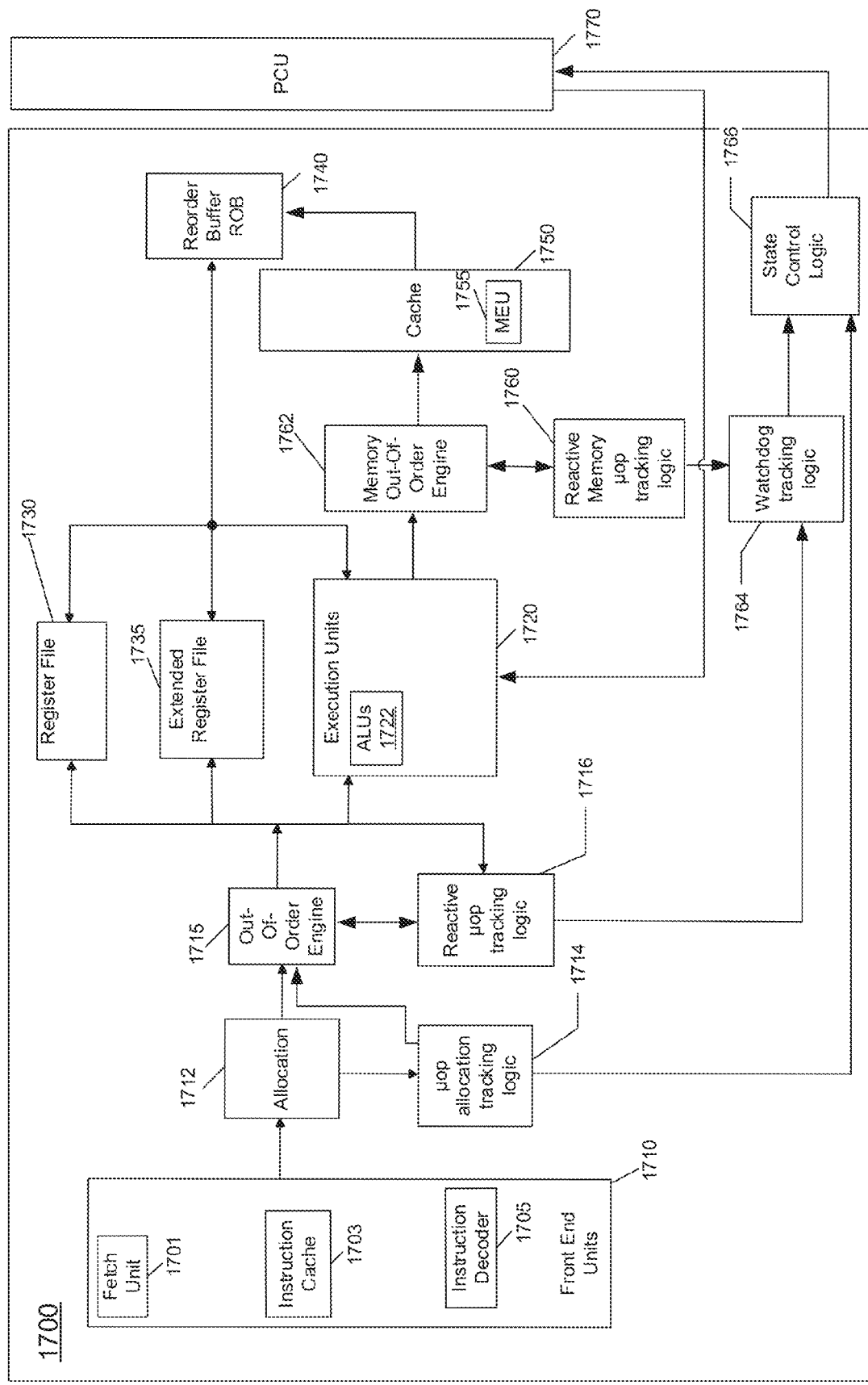
FIG. 17 is a block diagram of a processor core in accordance with an embodiment of the present invention.

FIG. 17 is a block diagram of a processor core 1700 in accordance with one embodiment of the present invention. As shown in FIG. 17, processor core 1700 may be a multi-stage pipelined out of order core that is coupled to a power control unit (PCU) 1770.

As seen in FIG. 17, core 1700 includes front end units 1710, which may be used to fetch instructions to be executed and prepare them for use later in the core 1700. For example, front end units 1710 may include a fetch unit 1701, an instruction cache 1703, and an instruction decoder 1705. In some implementations, front end units 1710 may further include a trace cache, along with microcode storage as well as a micro-operation storage (not shown). Fetch unit 1701 may fetch macro-instructions, e.g., from memory or from instruction cache 1703, and feed them to instruction decoder 1705 to decode them into primitives, i.e., micro-instructions (μops) for execution by the processor.

Coupled between front end units 1710 and execution units 1720 is allocation logic 1712 that is to provide the micro-instructions to an out of order (OOO) engine 1715 (also OOO logic herein) that may be used to receive the micro-instructions and prepare them for execution. The allocation logic 1712 may also provide renaming of logical registers onto storage locations within various register files, such as register file 1730 and extended register file, 1735, and manage various buffers inside OOO engine 1715 and memory OOO engine 1762. The OOO engine 1715 can select micro-instructions to execute, using various allocated buffers to safely re-order execution of the micro-instructions.

Register file 1730 may include separate register files for integer and floating point operations. Extended register file 1735 may provide storage for vector-sized units, e.g., 256 bits or 512 bits per register.

Micro-operation allocation tracking logic 1714 monitors μops that are output from the allocation logic 1712 to detect one or more high power μops that are to be executed. In an embodiment, a list of high power μops may be available to the μop allocation tracking logic 1714 (e.g., stored within the μop allocation tracking logic 1714) and each μop that is output from the allocation logic 1712 may be compared to entries in the list of high power μops in order to determine whether the μop that is output is a high power μop. In some embodiments, if a high-power μop is detected, the μop allocation tracking logic 1714 sends an indication to the OOO 1715 to throttle execution of instructions, e.g., reduce throughput of instructions for execution (e.g., by periodically halting flow for one cycle, or by halting and restarting execution, or by another throttling technique).

Throttling may be accomplished according to various schemes. In a first example, all μops are throttled down to a predetermined percentage dispatch rate (e.g., 30%). In a second example, throttling is only applied to a predetermined set of high powered μops. For example, in a 'block' cycle the high power μops (and only high power μops) may be blocked. In an 'allow' cycle, dispatch of the high power μops may be restarted. In some embodiments, the dispatch may be alternated between two high power dispatch ports (not shown).

Reactive μop tracking logic 1716 can detect dynamic changes in performance. In one embodiment, a dynamic change may be detected by comparison of a first count and type of instructions executed in a first time window to a second count and type of instructions executed in a second time window. For example, a first weighted sum of μops (e.g., each type of μop may be assigned a corresponding weight that reflects an associated power consumption during execution) to be executed in the first time window may be compared with a second weighted sum of μops to be executed in the second time window that is to occur after the first time window. A power ramp-up (or ramp-down) may be indicated based on a difference ($\Delta$) between the first weighted sum and the second weighted sum. For example, a power ramp-up may be indicated when $\Delta$ exceeds a threshold difference value. Alternatively, a most recent power usage can be compared to a rolling normalized history power calculation over a previous set of cycles, (e.g., the set may include a fixed number of cycles, such as 6 cycles, or up to 16 cycles), and a power ramp-up may be identified based on the comparison. In another embodiment, the first count in the first time window and the second count in the second time window may be monitored as the instructions are dispatched to the execution units, but before the instructions begin to execute.

In another embodiment, a second comparison may be made between windows that have another width, e.g., a relative prime number of cycles. For instance, if the first window and the second window are of length P cycles, the second comparison may be made between a third window and a fourth window, each including Q cycles, where Q<P. The second comparison may detect a power event that recurs within P cycles and might not be detected via the first comparison of windows each of length P cycles (e.g., first window and second window).

In one embodiment, a ramp pattern is employed to slow a rate of execution over the course of a plurality of cycles to reduce a worst-case risk and to give the power delivery system time to catch up, thus preventing voltage droop.

In another embodiment, the reactive μop tracking logic 1716 can identify a power event (e.g., power ramp-up or ramp-down) based on detection of toggling in one or more bits of data as μops are executed over time. Upon detection of a power ramp-up, the reactive μop tracking logic 1716 may indicate to the OOO 1715 to throttle flow of μops to be executed. Upon indication of a power ramp-down, the reactive μop tracking logic 1716 may indicate to the OOO 1715 to insert dummy work (e.g., dummy μops, dummy bit toggling, etc.) to prevent voltage spikes due to a reduction in current drawn during execution of μops.

In some embodiments, the reactive μop tracking logic 1716 may indicate to the OOO 1715 to throttle according to one of a plurality of different throttling plans (e.g., progressively more severe) responsive to a level of power usage or a power ramp-up/ramp-down detected.

Various resources may be present in the execution units 1720, including, for example, various integer, floating point, and single instruction multiple data (SIMD) logic units, among other specialized hardware. For example, such execution units may include one or more arithmetic logic units (ALUs) 1722, among other such execution units. Results from the execution units may be provided to retirement logic, namely a reorder buffer (ROB) 1740. More specifically, ROB 1740 may include various arrays and logic to receive information associated with instructions that are executed. This information may then be examined by ROB 1740 to determine whether the instructions can be validly retired and result data committed to an architectural state of the processor, or whether one or more exceptions have occurred that prevent a proper retirement of the instructions. Of course, ROB 1740 may handle other operations associated with retirement.

Memory instructions (e.g., memory μops such as loads and stores) may be output to a memory out of order (OOO) engine 1762 to be re-ordered prior to being sent to cache 1750 for execution by a memory execution unit (MEU) 1755. Reactive memory μop tracking logic 1760 may track memory μops to be executed in the cache 1750 and may detect a power event associated with a burst of memory traffic.

For example, in one embodiment the reactive memory μop tracking logic 1760 tracks a rolling N-cycle count of memory μops (e.g., 128-bit and 256-bit loads and stores) dispatched from the memory out of order engine 1762, and detects when the rolling N-cycle count exceeds a high threshold after a count over a determined number of cycles (e.g., M cycles) is below a low threshold. The determined number of M cycles may be programmable. Additionally, in some embodiments, the type of instructions (e.g., μops) being tracked, and/or the thresholds may be programmable. If the rolling N-cycle count exceeds the high threshold after the count over M cycles has been below the low threshold, the memory OOO engine 1762 can block dispatch of loads and stores according to a predetermined or programmable pattern.

For example, count 1 may be defined as the rolling count of all memory μops executed in the most recent N cycles, threshold1 may be defined as the low threshold, and threshold2 as the high threshold. According to one power control scheme, if count 1>threshold1, an M-cycle counter is reset. After reset, when the M-cycle counter reaches M, it saturates. If the M-cycle counter=M && count1>threshold2, throttling occurs according to the predetermined pattern.

Watchdog tracking logic 1764 maintains a history of power events received from the reactive μop tracking logic 1716 and the reactive memory μop tracking logic 1760. State control logic 1766 receives input from the watchdog tracking logic 1764 and from the μop allocation tracking logic 1714, and the state control logic 1766 may determine, based on activity level (e.g., μop execution rate and high power instructions), whether to request a higher guard band voltage to be supplied by power control unit (PCU) 1770 to the execution units 1720.

For example, in one embodiment when the reactive μop tracking logic 1716 and/or the reactive memory μop tracking logic 1760 firing rate exceeds a threshold rate, the PCU 1770 may be notified, which may result in an increase in the voltage guardband. During a delay time period between a request for higher voltage guardband and increased voltage guardband, μop dispatch can continue, with dynamic throttling as needed. Alternatively, μop dispatch rates can be throttled continually until the voltage guardband is raised.

While the implementation of FIG. 17 is with regard to an out of order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 18:
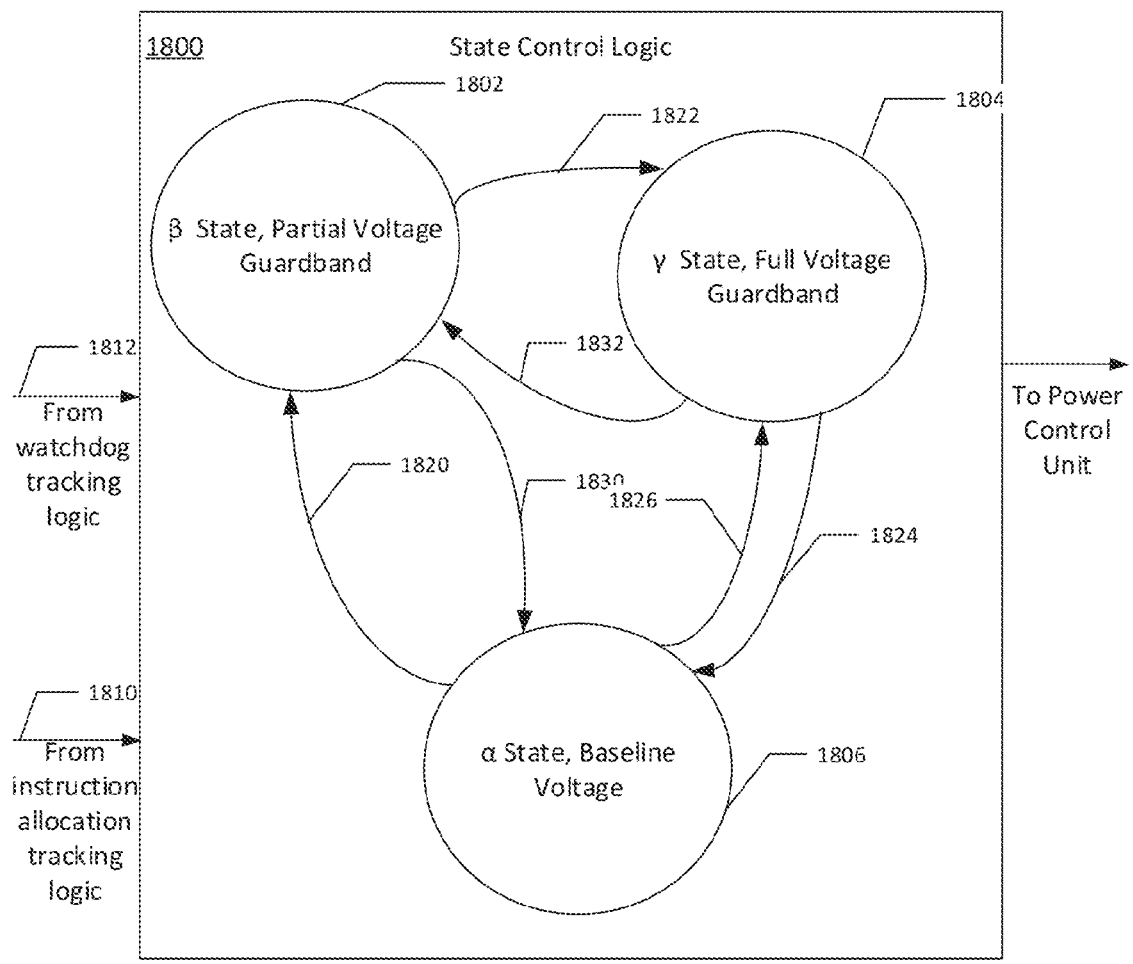
FIG. 18 is a block diagram of state control logic, according to an embodiment of the present invention.

FIG. 18 is a block diagram of state control logic 1800, according to embodiments of the present invention. The state control logic 1800 receives input 1810 from instruction allocation tracking logic (such as the μop allocation tracking logic 1714 of FIG. 17) and input 1812 from watchdog tracking logic (such as the watchdog tracking logic 1764 of FIG. 17). The state control logic 1800 includes a finite state engine that is in one of three possible states: α, β, and γ.

In the α state, the state control logic 1800 requests a baseline voltage to a power control unit (PCU), such as the PCU 1770 of FIG. 17. The baseline voltage is intended to provide enough voltage guardband to cover a certain set of applications, e.g., common applications where the lowest voltage (and lowest power consumption) is preferable, and for which a higher voltage guardband is unnecessary and excessive.

Two mechanisms may cause a transition to the beta (β) state from the alpha (α) state—a static scheme, and a dynamic scheme. Using the static scheme, if any μop is present in the machine that does not match specific top criteria, then transition to the beta state because the voltage guardband at the baseline voltage may not be enough to protect against droops caused by these "non-matching" μops.

The dynamic scheme, which may employ reactive instruction/μop tracking logic and/or reactive memory instruction/μop tracking logic, may detect droop-causing patterns within the set of matching instructions. Rather than setting the voltage guardband to counteract the greatest anticipated droop caused by instructions/μops of the matching types, the voltage guardband can be reduced to cover typical voltage droop levels. Voltage droops that are greater than typical may be responded to by temporarily throttling of dispatch rates of instructions/μops. Watchdog logic (e.g., in FIG. 17, watchdog tracking logic 1764 plus state control logic 1766) may be employed such that if the rate of throttling is too high, the state control logic 1766 transitions to the beta state. It may be more advantageous to raise the voltage and experience some loss of performance due to power limitations than to experience significant performance loss through frequent throttling.

Based on input received from the allocation tracking logic and/or from the watchdog tracking logic, the state control logic 1800 may request 1820 an increase in supplied voltage, also called partial voltage guardband (e.g., transition to the β state).

In the β state, a middle voltage guardband is designed to provide enough voltage guardband to cover typical voltage droops. The middle voltage guardband may be determined empirically. The β state relies on a dynamic mechanism to throttle droops larger than typical. A reactive scheme (e.g., based on input from reactive µop tracking logic 1716 of FIG. 17) may employ temporary instruction/µop throttling to reduce the voltage droop in the execution units, e.g., for instructions that may include add, subtract, multiply, and fused mul-add. Another reactive scheme (e.g., based on input from reactive memory µop tracking logic 1760 of FIG. 17) may employ temporary instruction/µop throttling to reduce the voltage droop in the memory units (e.g., stores and loads of data to/from the caches and memory). These reactive schemes may be tailored to catch cases of swings larger than are permitted by the guardband in the β state.

An increase in available voltage may reduce instances of voltage droop and may allow throttling of instruction execution to be reduced or eliminated. If (e.g., after a first hysteresis time period that may be programmable) there is no longer a request for a higher voltage due as a result of a reduction in power demand (e.g., fewer high power instructions to be executed, or reduced rate of instructions), the state control logic may return 1830 to the α state.

While in the β state, additional input from the watchdog tracking logic may cause the state control logic 1800 to shift 1822 to the γ state 1804, e.g., if the amount of throttling exceeds a certain rate, transition to the γ state 1804 occurs, in which dispatch rates of instructions/µops are fully restored dispatch rates and a higher voltage guardband is implemented.

In the γ state 1804, a request to the PCU may be issued for a full voltage guardband that is higher than the partial voltage guardband of the β state and that provides enough guardband to cover a highest anticipated voltage droop. No reactive schemes are employed in the γ state 1804, e.g., no throttling of instructions or memory instructions is employed. The γ state 1804 is typically selected for very high power usage situations, e.g., where instructions are processed that would result in frequent large voltage droops. (Dynamic throttling schemes that reduce instruction or µop dispatch rates would result in an unacceptable performance loss due to frequent blocking of instruction dispatch or µop dispatch.) For these high power usage instructions, it may be more advantageous to lose some overall performance by raising the operating voltage (which usually results in a small loss in frequency due to power limitations) than to permit frequent throttling events.

If (e.g., after a second hysteresis time period that may be programmable) there is no longer a request for a higher voltage due as a result of a reduction in power demand, the state control logic may return 1824 to the α state or may return 1832 to the β state. Additionally, a path 1826 may be available in some embodiments for a direct transition from α state 1806 to γ state 1804. By adjustment of the voltage guardband, throttling of instruction flow may be relaxed, which may result in more efficient execution of instructions. While FIG. 18 describes three voltage guardband states, alternative embodiments could contain any number of states with various voltage guardband levels and associated throttling thresholds, instruction classes, and throttling patterns.

Figure 19:
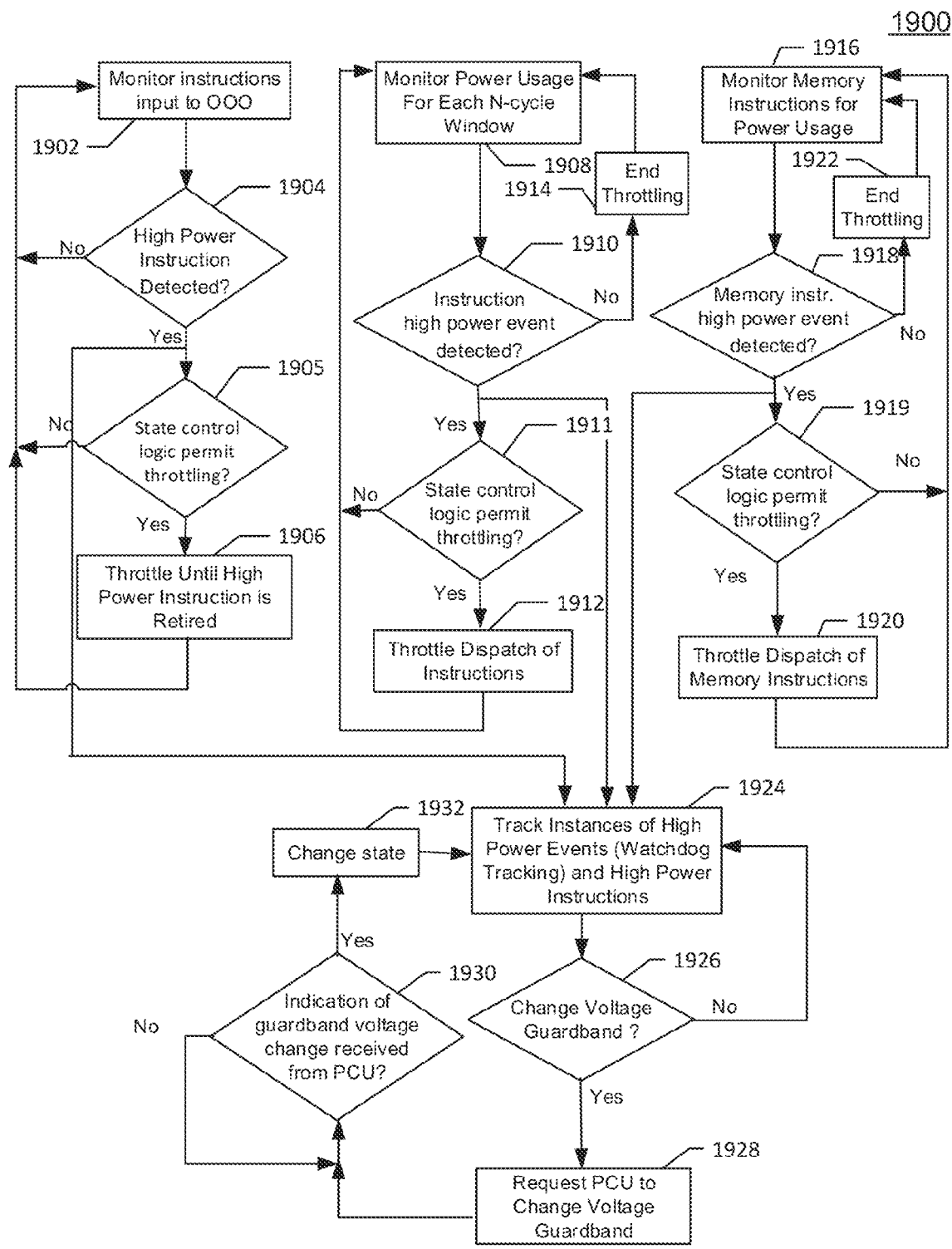
FIG. 19 is a flow diagram according to an embodiment of the present invention.

FIG. 19 is a flow diagram 1900 according to an embodiment of the present invention. A method according to flow diagram 1900 may be executed in a core of a processor. At block 1902, instructions input to an out of order dispatch logic (OOO) are monitored for type of instruction. Continuing to decision diamond 1904, if a high power (high risk) instruction is detected, an indication of the high power instruction is sent to watchdog tracking logic 1924, and advancing to block 1905, if state control logic permits throttling, moving to block 1906 instruction dispatch is throttled until the high power instruction is retired after execution, after which control returns to block 1902. If the state control logic does not permit throttling, returning to block 1902, the instructions input to the OOO are monitored continually to detect additional high power instructions. If, at decision diamond 1904, a high power instruction is not detected, control returns to block 1902.

In parallel with monitoring for high power instructions, at block 1908 power usage is monitored for each N-cycle window of time. Proceeding to decision diamond 1910, if an instruction high power event is detected an indication of the instruction high power event is sent to watchdog tracking logic (block 1924) and continuing to decision diamond 1911 if the state control logic permits throttling, advancing to block 1912 dispatch of instructions is throttled. Returning to block 1908, power usage continues to be monitored for each successive N-cycle window of time. If, at decision diamond 1910, a high power event is not detected, proceeding to block 1914 throttling is ended and control returns to block 1908.

In parallel with the monitoring for high power instructions and monitoring power usage for each N-cycle window, at block 1916 memory instructions are monitored for power usage, e.g., through comparison of power usage in successive time windows. Advancing to decision diamond 1918, if a memory high power event is detected an indication of the memory high power event is sent to watchdog tracking logic (block 1924) and proceeding to decision diamond 1919 if the state control logic permits throttling, continuing to block 1920 dispatch of memory instructions is throttled and control returns to block 1916. If the state control logic does not permit throttling, control returns to block 1916. If, at decision diamond 1918, no memory high power event is detected, proceeding to block 1922 throttling of memory instruction dispatch is ended and control returns to block 1916.

At block 1924, instances of high power instructions are counted (detected at decision diamond 1904) and high power events are counted (e.g., including a count of instruction high power events from a monitor of power usage for each N-cycle window, e.g., from reactive instruction tracking logic (decision diamond 1910), and a count of memory instruction high power events from a monitor of memory instructions, e.g., from reactive memory instruction tracking logic (decision diamond 1918)). Continuing to decision diamond 1926, a decision is made as to whether to change a voltage guardband (e.g., by state control logic), based at least in part on the count of high power instructions in the instruction queue, the count of instruction high power events, and the count of memory instruction high power events. If it is decided that the voltage guardband is to be changed, continuing to block 1928 a request is sent to a power control unit (PCU) to change the voltage guardband. Advancing to decision diamond 1930, if an indication of a change in guardband voltage is received from the PCU (e.g., at the state control logic), moving to block 1932 a change in state is effected (e.g., from α to β, from β to γ, etc.); otherwise, the change in state is delayed until the indication of voltage change is received from the PCU. After the change of state is effected, instances of high power events and high power instructions continue to be tracked, at block 1924.

Figure 20:
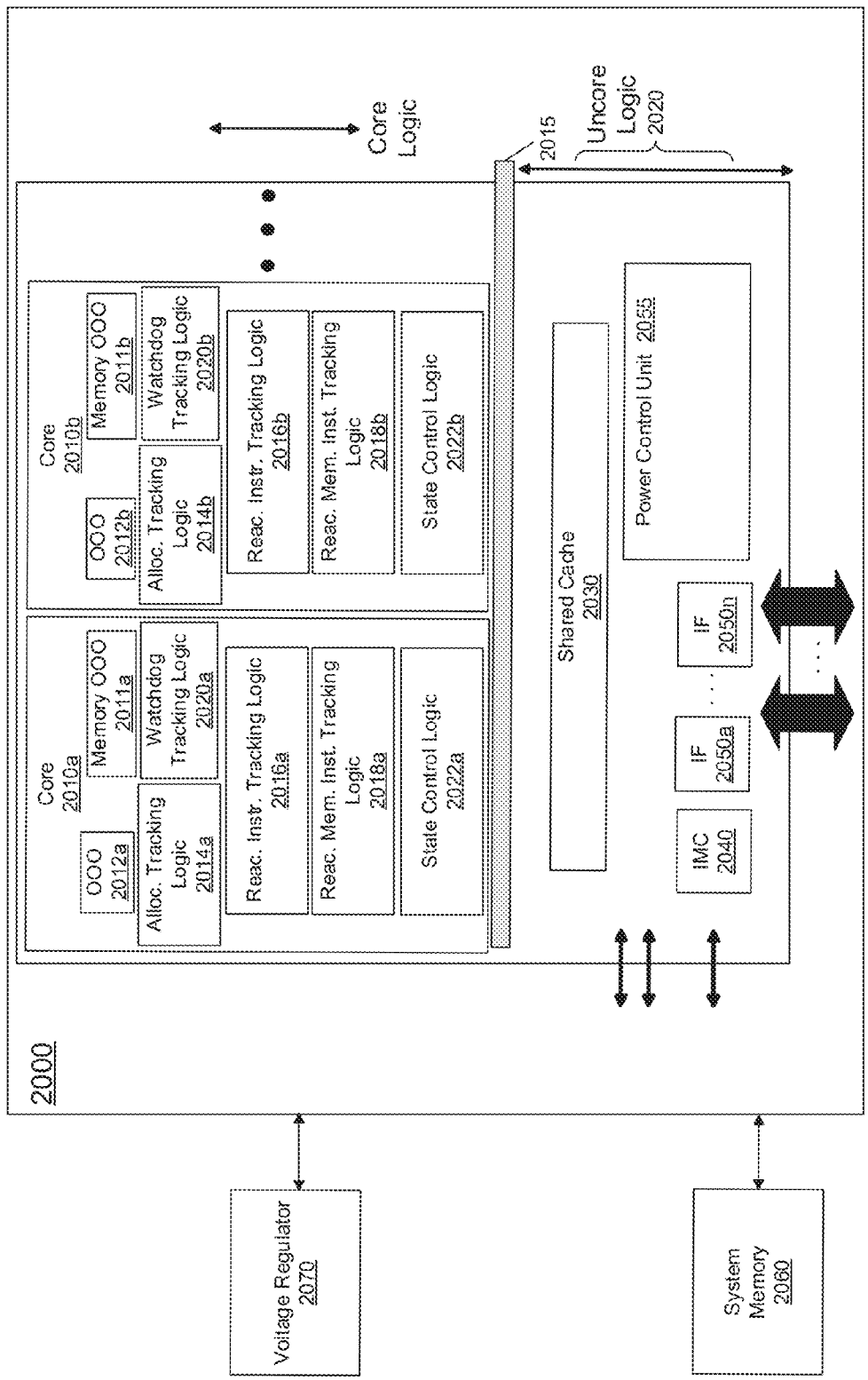
FIG. 20 is a block diagram of a processor in accordance with an embodiment of the present invention.

Referring now to FIG. 20, shown is a block diagram of a processor in accordance with an embodiment of the present invention. As shown in FIG. 20, processor 2000 may be a multicore processor including a plurality of cores $2010_a$, $2010_b$, etc. and coupled to a system memory 2060. In one embodiment, each core $2010_i$ (i=a, b, . . . ) may be of an independent power domain and can be configured to operate at an independent voltage and/or frequency. As seen, each core $2010_i$ can include allocation tracking logic $2014_i$ to detect a presence of high power instructions in an instruction queue, reactive instruction tracking logic $2016_i$ to detect an onset of an instruction high power event and to throttle dispatch of instructions from an OOO $2012_i$, reactive memory instruction tracking logic $2018_i$ to detect a memory instruction high power event and to throttle dispatch of memory instructions from a memory OOO $2011_i$, watchdog tracking logic $2020_i$ to store a history of high power events including instruction high power events and/or memory instruction high power events, and state control logic $2022_i$ including a state engine to determine a voltage guardband request to a power control unit 2055 based on input received from the watchdog tracking logic $2020_i$ and the allocation tracking logic $2014_i$, in accordance with embodiments of the present invention.

The various cores $2010_i$ may be coupled via an interconnect 2015 to a system agent or uncore logic 2020 that includes various components. As seen, the uncore logic 2020 may include a shared cache 2030 which may be a last level cache. In addition, the uncore may include an integrated memory controller 2040, various interfaces 2050 and the power control unit 2055. With further reference to FIG. 20, processor 2000 may communicate with a system memory 2060, e.g., via a memory bus. In addition, by interfaces 2050, connection can be made to various off-chip components such as peripheral devices, mass storage and so forth. Also shown in FIG. 20 is a voltage regulator 2070, which may be controlled, e.g., by the power control unit 2055, to provide a regulated operating voltage. While shown with this particular implementation in the embodiment of FIG. 20, the scope of the present invention is not limited in this regard.

Figure 21:
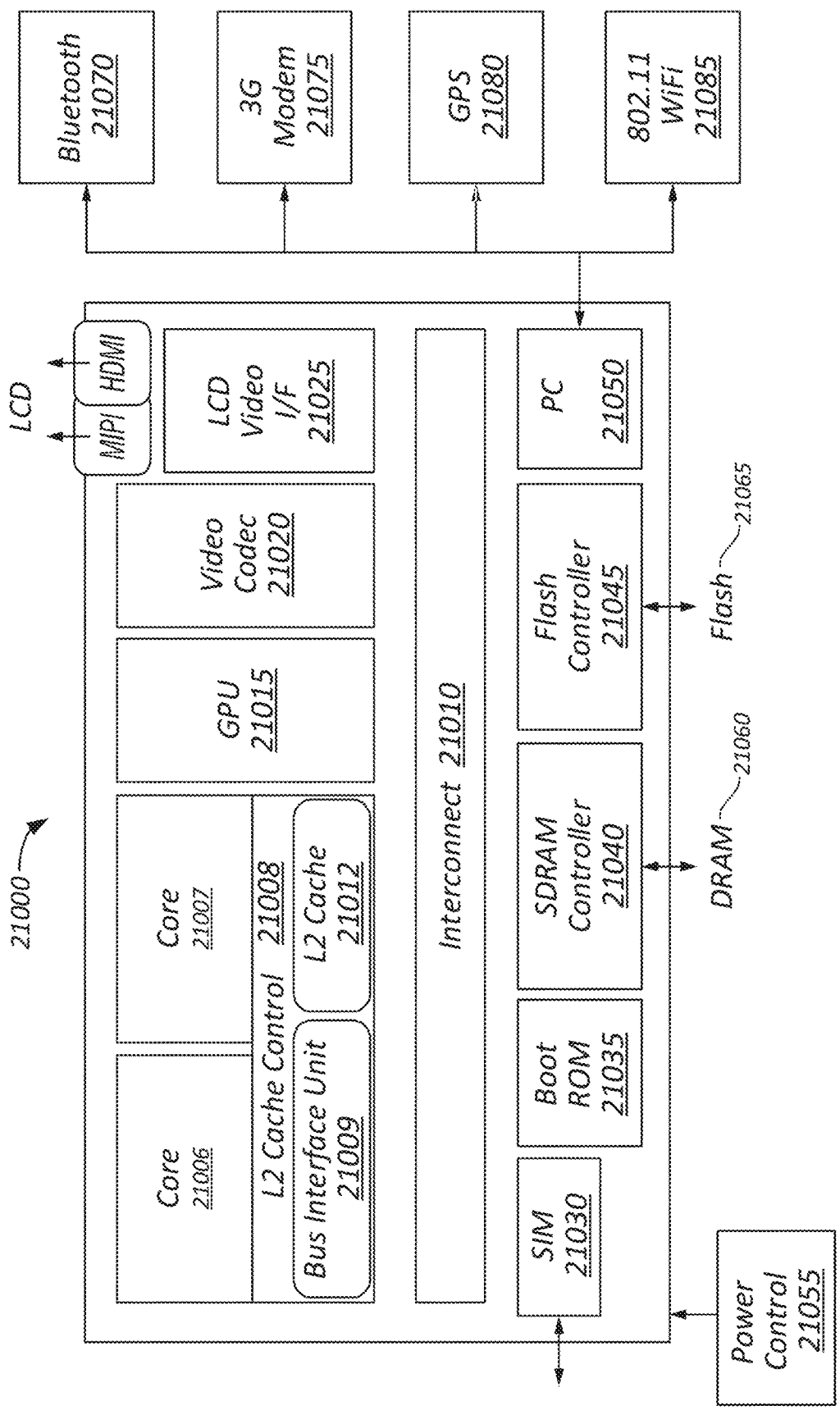
FIG. 21 is a block diagram of a system on a chip (SoC) design in accordance with an embodiment of the present invention.

FIG. 21 is a block diagram of a system on a chip (SoC) design in accordance with an embodiment of the present invention. As a specific illustrative example, SoC 21000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 21000 includes two cores—21006 and 21007. Cores 21006 and 21007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 21006 and 21007 are coupled to cache control 21008 that is associated with bus interface unit 21009 and L2 cache 21012 to communicate with other parts of system 21000. Interconnect 21010 includes an on-chip interconnect, such as an IOSF, AMBA.

One or both of the cores 21006 and 21007 can include allocation tracking logic to detect a presence of high power instructions in an instruction queue, reactive instruction tracking logic to detect an onset of an instruction high power event, reactive memory instruction tracking logic to detect a memory instruction high power event, watchdog tracking logic to store a history of high power events including high power instruction high power event and/or memory instruction high power events, and state control logic including a state engine to determine a voltage guardband to request from a power control unit 21055 based on input received from the watchdog tracking logic and the allocation tracking logic, in accordance with embodiments of the present invention.

Interconnect 21010 provides communication channels to other components, such as a Subscriber Identity Module (SIM) 21030 to interface with a SIM card, a boot ROM 21035 to hold boot code for execution by cores 21006 and 21007 to initialize and boot SOC 21000, a SDRAM controller 21040 to interface with external memory (e.g. DRAM 21060), a flash controller 21045 to interface with non-volatile memory (e.g. Flash 21065), a peripheral controller 21050 (e.g. Serial Peripheral Interface) to interface with peripherals, video codecs 21020 and Video interface 21025 to display and receive input (e.g. touch enabled input), GPU 21015 to perform graphics related computations, etc.

In addition, the system illustrates peripherals for communication, such as a Bluetooth module 21070, 3G modem 21075, GPS 21080, and WiFi 21085. Also included in the system is power control unit 21055. Note as stated above, a UE includes a radio for communication. As a result, these peripheral communication modules are not all required. However, in a UE some form of radio for external communication may be included.

Additional embodiments are described below.

In a first example, a processor includes at least one core including a first core. The first core includes memory execution logic to execute one or more memory instructions and memory dispatch logic to output a plurality of memory instructions to the memory execution logic. The first core also includes reactive memory instruction tracking logic to detect an onset of a memory instruction high power event associated with execution of a least one of the memory instructions and to indicate to the memory dispatch logic to throttle output of the memory instructions to the memory execution logic responsive to detection of the onset of the memory instruction high power event. The processor also includes cache memory coupled to the at least one core.

In a second example that includes the features of the first example, the reactive memory instruction tracking logic is to indicate to the memory dispatch logic to cease throttling the output of the memory instructions to the memory execution logic responsive to detection that the memory instruction high power event is ended.

In third example that includes the features of the first example and optionally includes the features of the second example, the first core further includes dispatch logic to dispatch a plurality of instructions to execution logic, and allocation tracking logic to detect whether the plurality of instructions includes at least one high power instruction. When the plurality of instructions includes a high power instruction, the allocation tracking logic is to indicate to the dispatch logic to throttle dispatch of the instructions to the execution logic.

In a fourth example that includes the features of the third example, the allocation tracking logic is to indicate to the dispatch logic to discontinue throttling the dispatch of the instructions after the at least one high power instruction is retired following execution of the at least one high power instruction.

In a fifth example that includes the features of the first example and optionally includes the features of the second, third, and/or fourth examples, the first core includes reactive instruction tracking logic to detect an onset of one or more instruction high power events associated with execution of instructions by the first core, and responsive to detection of the onset of an instruction high power event, to indicate to dispatch logic to throttle input of the instructions to the execution logic.

In a sixth example that includes the features of the fifth example, the first core includes state control logic to receive a first input that is based at least in part on a count of the one or more instruction high power events whose onset is detected during a first time period. The state control logic is to receive a second input that is based on an indication of whether the instructions to be executed by the first core includes at least one high power instruction, and to determine whether to request a change in a voltage guardband for the first core based at least in part on the first input and the second input.

In a seventh example that includes the features of the sixth example, the state control logic is further to, based on a change detected in at least one of the first input and the second input during the first time period, request the change in the voltage guardband.

In an eighth example that includes the features of the sixth example, the state control logic is further to, based on a change detected in at least one of the first input and the second input during the first time period, request a change in at least one of a memory instruction output rate of the memory instructions output by the memory dispatch logic and a change in an instruction output rate of instructions output by the dispatch logic.

In a ninth example that includes the features of the sixth example, the first core further comprises watchdog tracking logic to maintain the count of instruction high power events detected by the reactive instruction tracking logic during the first time period and to provide the first input based at least in part on the count of instruction high power events.

In a tenth example that includes the features of the ninth example, the watchdog tracking logic is further to maintain a count of memory instruction high power events each of which has a corresponding onset detected by the reactive memory instruction tracking logic during the first time period, wherein the first input is based at least in part on the count of the memory instruction high power events for each of which the corresponding onset is detected during the first time period.

In an eleventh example, a processor includes at least one core including a first core, and state control logic. Responsive to an indication of at least one high power event associated with execution of instructions in the first core, the state control logic is to determine whether to issue to a power control logic a voltage adjustment request to adjust a voltage guardband for the first core.

In a twelfth example that includes the features of the eleventh example, the processor further includes allocation tracking logic to detect whether the instructions include at least one high power instruction and to provide an indication to the state control logic when at least one high power instruction is detected in the instructions. The state control logic is to determine whether to issue the voltage adjustment request based at least in part on the indication provided by the allocation tracking logic.

In a thirteenth example that includes the features of the twelfth example, the processor includes out of order logic to dispatch the instructions for execution by execution logic in the first core. The allocation tracking logic is to, responsive to detection of the at least one high power instruction in the instructions, indicate to the out of order logic to adjust a rate of output of instructions to be dispatched for execution by the execution logic.

In a $14^{th}$ example that includes the features of the eleventh example, the processor further includes reactive instruction tracking logic to detect one or more instruction high power events, and the watchdog tracking logic is to store a count of instruction high power events detected by the reactive instruction tracking logic in a first time period, and to determine whether to issue the indication of at least one high power event to the state control logic based at least in part on the count of instruction high power events.

In a $15^{th}$ example that includes the features of the $14^{th}$ example, the processor further includes out of order logic to dispatch the instructions for execution by execution logic in the first core, where the reactive instruction tracking logic is to, responsive to a first instruction high power event detected, indicate to the out of order logic to throttle output of instructions dispatched for execution by the execution logic.

In a $16^{th}$ example that includes the features of the $11^{th}$ example, the processor further includes reactive memory instruction tracking logic to detect at least one memory instruction high power event associated with execution of memory instructions, and responsive to detection of the at least one memory instruction high power event to indicate to memory dispatch logic to adjust a rate of output of the memory instructions for execution by a memory execution logic of the first core.

In a $17^{th}$ example that includes the features of the $16^{th}$ example, the reactive memory instruction tracking logic is further to input to watchdog tracking logic a memory instruction high power event indication for each memory instruction high power event detected, and the watchdog tracking logic is to store a count of memory instruction high power events detected by the reactive memory instruction tracking logic during a second time period and to determine whether to issue the indication of at least one high power event to the state control logic based at least in part on the count of memory instruction high power events.

In an $18^{th}$ example, a computer readable medium stores executable instructions that, when executed by a machine, cause the machine to detect an onset of a memory instruction high power event associated with execution of at least one memory instruction of a plurality of memory instructions in a memory instruction execution queue, and to throttle a rate of execution of the memory instructions responsive to detection of the onset of the memory instruction high power event.

In a $19^{th}$ example that includes the features of the $18^{th}$ example, the computer readable medium further stores instructions to detect an onset of an instruction high power event associated with execution of at least one instruction of a plurality of instructions in an instruction execution queue that includes non-memory operations, and to throttle a rate of execution of the instructions responsive to detection of the onset of the instruction high power event.

In a $20^{th}$ example that includes the features of the $19^{th}$ example, the computer readable medium further stores instructions to maintain a first count of memory instruction high power events and a second count of instruction high power events, to receive an indication of whether the plurality of instructions includes at least one high power instruction, and to determine whether to generate a request to change a voltage guardband for a core based on the first count, the second count, and the indication.

In a $21^{th}$ example, a method includes detecting an onset of a memory instruction high power event associated with execution of at least one memory instruction of a plurality of memory instructions in a memory instruction execution queue, and throttling a rate of execution of the memory instructions responsive to detection of the onset of the memory instruction high power event.

In a $22^{th}$ example that includes the features of the $21^{th}$ example, the method includes detecting an onset of an instruction high power event associated with execution of at least one instruction of a plurality of instructions in an instruction execution queue that includes non-memory operations, and throttling a rate of execution of the instructions responsive to detection of the onset of the instruction high power event.

In a $23^{th}$ example that includes the features of the $22^{nd}$ example, the method includes maintaining a first count of memory instruction high power events and a second count of instruction high power events, receiving an indication of whether the plurality of instructions includes at least one high power instruction, and determining whether to generate a request to change a voltage guardband for a core based on the first count, the second count, and the indication.

A $24^{th}$ example is an apparatus that includes means for performing the method of any one of examples 21 to 23.

A $25^{th}$ example is an apparatus to perform the method of any one of examples 21 to 23.

A $26^{th}$ example is a processor that includes at least one core including a first core, where the first core includes memory execution means for executing one or more memory instructions, and memory dispatch means for outputting a plurality of memory instructions to the memory execution logic. The first core also includes reactive memory instruction tracking means for detecting an onset of a memory instruction high power event associated with execution of a least one of the memory instructions and for indicating to the memory dispatch logic to throttle output of the memory instructions to the memory execution logic responsive to detection of the onset of the memory instruction high power event. The processor also includes cache memory coupled to the at least one core.

A $27^{th}$ example includes the features of the $26^{th}$ example, where the reactive memory instruction tracking means is further for indicating to the memory execution logic to cease throttling the output of the memory instructions to the memory execution means responsive to detection that the memory instruction high power event is ended.

A $28^{th}$ example includes the features of the $26^{th}$ example, where the first core further includes dispatch means for dispatching a plurality of instructions to execution logic, and allocation tracking means for detecting whether the plurality of instructions includes at least one high power instruction. When the plurality of instructions includes a high power instruction, the allocation tracking means is further for indicating to the dispatch means to throttle dispatch of the instructions to the execution logic.

A $29^{th}$ example includes the features of the $28^{th}$ example, where the allocation tracking means is further for indicating to the dispatch means to discontinue throttling the dispatch of the instructions after the at least one high power instruction is retired following execution of the at least one high power instruction.

A $30^{th}$ example includes the features of any combination of examples 26 to 29, where the first core further includes reactive instruction tracking means for detecting one or more instruction high power events associated with execution of instructions by the first core. The reactive instruction tracking means, responsive to detection of the onset of an instruction high power event, is further for indicating to dispatch logic to throttle input of the instructions to the execution logic.

A $31^{th}$ example includes the features of the $30^{th}$ example, and the first core further includes state control means for receiving a first input that is based at least in part on a count of instruction high power events whose onset is detected during a first time period, means for receiving a second input that is based on an indication of whether the instructions to be executed by the first core includes at least one high power instruction, and means for determining whether to request a change in a voltage guardband for the first core based at least in part on the first input and the second input.

A $32^{nd}$ example includes the features of the $31^{st}$ example, where the state control means is further for, based on a change detected in at least one of the first input and the second input during the first time period, requesting the change in the voltage guardband.

A $33^{rd}$ example includes the features of the $31^{st}$ example, where the state control means is further for, based on a change detected in at least one of the first input and the second input during the first time period, requesting a change in at least one of a memory instruction output rate of the memory instructions output by the memory dispatch means and a change in an instruction output rate of instructions output by the dispatch means.

A $34^{th}$ example includes the features of the $31^{st}$ example, where the first core further includes watchdog tracking means for maintaining the count of instruction high power events whose onset is detected by the instruction tracking means during the first time period. The watchdog tracking means is further for providing the first input based at least in part on the count of instruction high power events.

A $35^{th}$ example includes the features of the 34th example, where the watchdog tracking means is further for maintaining a count of memory instruction high power events detected by the reactive memory instruction tracking means during the first time period, wherein the first input is based at least in part on the count of the memory instruction high power events detected during the defined time period.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one core including a first core, wherein the first core includes:
execution logic to execute one or more instructions;
dispatch logic to output a plurality of instructions to the execution logic;
control logic to operate in one of three possible states comprising a first state, a second state, and a third state, wherein the control logic is to:
in the first state, provide a baseline voltage to the first core;
in the third state, provide a high voltage to the first core; and
in the second state:
provide a middle voltage to the first core, wherein the middle voltage is higher than the baseline voltage and is lower than the high voltage;
detect an onset of an instruction high power event associated with execution of a least one of the instructions;
cause the dispatch logic to throttle output of the instructions to the execution logic to a first output level responsive to detection of the onset of the instruction high power event;
determine a rate of throttling of the dispatch logic; and
in response to a determination that the rate of throttling of the dispatch logic exceeds a threshold, transition to the third state, wherein the third state comprises ceasing throttling the output of the instructions to the execution logic; and
cache memory coupled to the at least one core.

2. The processor of claim 1, wherein the first state comprises throttling output of the instructions to the execution logic to a second output level.

3. The processor of claim 1, wherein the control logic is to detect whether the plurality of instructions includes at least one high power instruction, wherein when the plurality of instructions includes a high power instruction, the control logic is to cause the dispatch logic to throttle dispatch of the instructions to the execution logic.

4. The processor of claim 3, wherein the control logic is to discontinue throttling the dispatch of the instructions after the at least one high power instruction is retired following execution of the at least one high power instruction.

5. The processor of claim 1, wherein the middle voltage provides a partial voltage guardband, wherein the partial voltage guardband is sufficient to tolerate a typical anticipated voltage droop in the first core.

6. The processor of claim 5, wherein the high voltage provides a full voltage guardband, wherein the full voltage guardband is sufficient to tolerate a maximum anticipated voltage droop in the first core.

7. The processor of claim 1, wherein the control logic comprises a plurality of dynamic detectors to detect voltage droops in the first core.

8. The processor of claim 7, wherein each of the plurality of dynamic detectors is located in a different point in a processing pipeline.

9. A processor comprising:
at least one core including a first core; and
control logic to operate in one of three possible states comprising a first state, a second state, and a third state, wherein the control logic is to:
in the first state, provide a baseline voltage to the first core;
in the third state, provide a high voltage to the first core; and
in the second state:
provide a middle voltage to the first core, wherein the middle voltage is higher than the baseline voltage and is lower than the high voltage;
responsive to an indication of at least one high power event associated with execution of instructions in the first core, throttle output of instructions dispatched for execution by execution logic of the first core to a first output level;
determine a rate of throttling of the instructions to the execution logic of the first core; and
in response to a determination that the rate of throttling exceeds a threshold, transition to the third state, wherein the third state comprises ceasing throttling the output of the instructions to the execution logic.

10. The processor of claim 9, wherein the high voltage provides a full voltage guardband.

11. The processor of claim 10, wherein the full voltage guardband is sufficient to tolerate a maximum anticipated voltage droop in the first core.

12. The processor of claim 9, wherein the middle voltage provides a partial voltage guardband, wherein the partial voltage guardband is sufficient to tolerate a typical anticipated voltage droop in the first core.

13. The processor of claim 9, wherein the control logic comprises a plurality of dynamic detectors to detect voltage droops in the processor.

14. The processor of claim 13, wherein each of the plurality of dynamic detectors is located in a different point in a processing pipeline of the processor.

15. A non-transitory machine readable medium having stored thereon instructions that, when executed by a machine, cause the machine to perform a method comprising:
operating a first core of a processor in one of three possible states comprising a first state, a second state, and a third state;
in the first state, providing a baseline voltage to the first core;
in the third state, providing a high voltage to the first core;
in the second state:
providing a middle voltage to the first core, wherein the middle voltage is higher than the baseline voltage and is lower than the high voltage;

detecting an onset of a instruction high power event associated with execution of at least one instruction of a plurality of instructions in an instruction execution queue;

throttling a rate of execution of the instructions to the first core responsive to detection of the onset of the instruction high power event;

determining a rate of throttling of the instructions to the first core; and in response to a determination that the rate of throttling exceeds a threshold, transition to the third state, wherein the third state comprises ceasing throttling the output of the instructions to the execution logic.

16. The non-transitory machine readable medium of claim 15, wherein the high voltage provides a full voltage guardband sufficient to tolerate a maximum anticipated voltage droop in the first core.

17. The non-transitory machine readable medium of claim 16, wherein the middle voltage provides a partial voltage guardband sufficient to tolerate a typical anticipated voltage droop in the first core.

* * * * *